US008821832B2

(12) United States Patent
Brantley et al.

(10) Patent No.: US 8,821,832 B2
(45) Date of Patent: Sep. 2, 2014

(54) FUEL PROCESSOR FOR USE WITH PORTABLE FUEL CELLS

(75) Inventors: Jennifer E. Brantley, Dublin, CA (US); Ian W. Kaye, Livermore, CA (US); Arpad Somogyvari, Livermore, CA (US); Gerry Tucker, Pleasanton, CA (US); Fan Liang Chan, Livermore, CA (US)

(73) Assignee: UltraCell, L.L.C., Commack, NY (US)

( * ) Notice: Subject to any disclaimer, the term of this patent is extended or adjusted under 35 U.S.C. 154(b) by 220 days.

(21) Appl. No.: 13/310,944

(22) Filed: Dec. 5, 2011

(65) Prior Publication Data
US 2013/0142725 A1     Jun. 6, 2013

Related U.S. Application Data

(60) Division of application No. 11/313,252, filed on Dec. 19, 2005, now abandoned, which is a continuation-in-part of application No. 10/877,044, filed on Jun. 25, 2004, now Pat. No. 7,604,673.

(60) Provisional application No. 60/482,996, filed on Jun. 27, 2003, provisional application No. 60/483,416, filed on Jun. 27, 2003, provisional application No. 60/638,421, filed on Dec. 21, 2004, provisional application No. 60/649,638, filed on Feb. 2, 2005.

(51) Int. Cl.
*C01B 3/22* (2006.01)
*C01B 3/24* (2006.01)
*C01B 3/26* (2006.01)
*H01M 8/06* (2006.01)

(52) U.S. Cl.
USPC ........ 423/648.1; 423/650; 423/651; 423/652; 429/423; 429/424; 429/425

(58) Field of Classification Search
USPC ................ 423/648.1, 650–654; 429/423–425
See application file for complete search history.

(56) References Cited

U.S. PATENT DOCUMENTS 3,119,671 A     1/1964   Koniewiez et al.
3,541,729 A    11/1970   Dantowitz
(Continued)

FOREIGN PATENT DOCUMENTS

DE      19841993        3/2000
JP      06-310166 A    11/1994
(Continued)

OTHER PUBLICATIONS

"Methanol-Powered Laptops—Cleared for Take-Off", www.silicon.com, Oct. 7, 2002.
A. Pattekar et al., "A Microreactor for In-situ Hydrogen Production by Catalytic Methanol Reforming", May 27-30, 2001, Proceedings of the 5$^{th}$ International Conference on Microreaction Technology.
A. Pattekar et al., "Novel Microfluidic Interconnectors for High Temperature and Pressure Applications", 2003, Journal of Micromechanics and Microengineering, 13, 337-345.
(Continued)

*Primary Examiner* — Wayne Langel
(74) *Attorney, Agent, or Firm* — Keusey & Associates, P.C.

(57) ABSTRACT

The invention relates to a fuel processor that produces hydrogen from a fuel. The fuel processor comprises a reformer and a heater. The reformer includes a catalyst that facilitates the production of hydrogen from the fuel; the heater provides heat to the reformer. Multipass reformer and heater chambers are described that reduce fuel processor size. Single layer fuel processors include reformer and heater chambers in a compact form factor that is well suited for portable applications. Some fuel processors described herein place an electrically resistive material in contact with a thermally conductive material to heat fuel entering the fuel processor. This is particularly useful during start-up of the fuel processor. Fuel processors described may also include features that facilitate assembly.

19 Claims, 16 Drawing Sheets

(56) References Cited

U.S. PATENT DOCUMENTS

| | | | |
|---|---|---|---|
| 3,578,952 A | 5/1971 | Boose | |
| 3,595,628 A | 7/1971 | Connor et al. | |
| 4,335,023 A | 6/1982 | Dettling et al. | |
| 4,391,794 A * | 7/1983 | Silberring | 423/650 |
| 4,504,447 A | 3/1985 | Spurrier et al. | |
| 4,522,894 A | 6/1985 | Hwang et al. | |
| 4,909,808 A | 3/1990 | Voecks | |
| 5,081,095 A | 1/1992 | Bedford et al. | |
| 5,145,491 A | 9/1992 | Schmitt et al. | |
| 5,209,906 A | 5/1993 | Watkins et al. | |
| 5,229,102 A * | 7/1993 | Minet et al. | 423/652 |
| 5,525,436 A | 6/1996 | Savinell et al. | |
| 5,534,328 A | 7/1996 | Ashmead et al. | |
| 5,601,938 A | 2/1997 | Mayer et al. | |
| 5,611,214 A | 3/1997 | Wegeng et al. | |
| 5,641,585 A | 6/1997 | Lessing et al. | |
| 5,676,911 A | 10/1997 | Baumert et al. | |
| 5,716,727 A | 2/1998 | Savinell et al. | |
| 5,733,347 A | 3/1998 | Lesieur | |
| 5,789,093 A | 8/1998 | Malhi | |
| 5,811,062 A | 9/1998 | Wegeng et al. | |
| 5,858,314 A | 1/1999 | Hsu et al. | |
| 5,938,800 A * | 8/1999 | Verrill et al. | 48/127.9 |
| 5,961,930 A | 10/1999 | Chatterjee et al. | |
| 5,961,932 A | 10/1999 | Ghosh et al. | |
| 6,077,620 A | 6/2000 | Pettit | |
| 6,080,501 A | 6/2000 | Kelley et al. | |
| 6,159,434 A | 12/2000 | Gonjo et al. | |
| 6,193,501 B1 | 2/2001 | Masel et al. | |
| 6,200,536 B1 | 3/2001 | Tonkovich et al. | |
| 6,232,005 B1 | 5/2001 | Pettit | |
| 6,238,815 B1 | 5/2001 | Skala et al. | |
| 6,245,214 B1 | 6/2001 | Rehg et al. | |
| 6,268,077 B1 | 7/2001 | Kelley et al. | |
| 6,280,864 B1 | 8/2001 | Towler et al. | |
| 6,294,149 B1 * | 9/2001 | Autenrieth et al. | 423/648.1 |
| 6,312,846 B1 | 11/2001 | Marsh | |
| 6,406,808 B1 | 6/2002 | Pratt et al. | |
| 6,415,860 B1 | 7/2002 | Kelly et al. | |
| 6,423,434 B1 | 7/2002 | Pratt et al. | |
| 6,460,733 B2 | 10/2002 | Acker et al. | |
| 6,465,119 B1 | 10/2002 | Koripella et al. | |
| 6,470,569 B1 | 10/2002 | Lippert et al. | |
| 6,537,352 B2 | 3/2003 | Edlund et al. | |
| 6,537,506 B1 | 3/2003 | Schwalbe et al. | |
| 6,541,676 B1 | 4/2003 | Franz et al. | |
| 6,569,553 B1 | 5/2003 | Koripella et al. | |
| 6,572,837 B1 * | 6/2003 | Holland et al. | 423/648.1 |
| 6,638,654 B2 | 10/2003 | Jankowksi et al. | |
| 6,645,443 B1 | 11/2003 | Vogel et al. | |
| 6,673,130 B2 | 1/2004 | Jankowski et al. | |
| 6,740,303 B2 * | 5/2004 | Boneberg et al. | 423/652 |
| 6,753,036 B2 | 6/2004 | Jankowski et al. | |
| 6,770,106 B1 | 8/2004 | Okamoto et al. | |
| 6,810,899 B2 | 11/2004 | Franz et al. | |
| 6,821,666 B2 | 11/2004 | Morse et al. | |
| 6,887,587 B2 | 5/2005 | Allen et al. | |
| 6,911,193 B2 | 6/2005 | Allison et al. | |
| 6,913,998 B2 | 7/2005 | Jankowski et al. | |
| 6,921,603 B2 | 7/2005 | Morse et al. | |
| 6,932,958 B2 | 8/2005 | Wangerow et al. | |
| 6,939,632 B2 | 9/2005 | Arana et al. | |
| 6,960,235 B2 | 11/2005 | Morse et al. | |
| 6,960,403 B2 | 11/2005 | Morse et al. | |
| 7,014,835 B2 | 3/2006 | Mathias et al. | |
| 7,056,477 B1 | 6/2006 | Schwalbe et al. | |
| 7,115,148 B2 | 10/2006 | Wheeldon et al. | |
| 7,186,352 B2 | 3/2007 | Morse et al. | |
| 7,205,060 B2 * | 4/2007 | Kaye et al. | 429/424 |
| 7,214,251 B2 | 5/2007 | Oh et al. | |
| 7,250,151 B2 * | 7/2007 | Tonkovich et al. | 423/659 |
| 7,276,096 B2 * | 10/2007 | Kaye et al. | 48/198.1 |
| 7,763,368 B2 * | 7/2010 | Kaye et al. | 429/424 |
| 2001/0029735 A1 | 10/2001 | Miura et al. | |
| 2001/0029974 A1 | 10/2001 | Cohen et al. | |
| 2001/0031592 A1 | 10/2001 | Schulz | |
| 2002/0012825 A1 | 1/2002 | Sasahara et al. | |
| 2002/0041844 A1 * | 4/2002 | Cantacuzene et al. | 423/651 |
| 2002/0045082 A1 | 4/2002 | Marsh | |
| 2002/0076599 A1 | 6/2002 | Neutzler et al. | |
| 2002/0081468 A1 | 6/2002 | Shioya | |
| 2002/0094462 A1 | 7/2002 | Shioya et al. | |
| 2002/0098119 A1 | 7/2002 | Goodman | |
| 2002/0106540 A1 | 8/2002 | Shioya | |
| 2002/0127141 A1 | 9/2002 | Acker | |
| 2002/0131915 A1 | 9/2002 | Shore et al. | |
| 2002/0131921 A1 | 9/2002 | Ishikawa | |
| 2002/0132156 A1 | 9/2002 | Ruhl et al. | |
| 2002/0146359 A1 * | 10/2002 | Lomax et al. | 422/198 |
| 2002/0147107 A1 | 10/2002 | Abdo et al. | |
| 2002/0150804 A1 | 10/2002 | Srinivasan et al. | |
| 2002/0152681 A1 | 10/2002 | Oh et al. | |
| 2002/0155335 A1 | 10/2002 | Kearl | |
| 2002/0168557 A1 * | 11/2002 | Grieve et al. | 429/17 |
| 2002/0192537 A1 | 12/2002 | Ren | |
| 2003/0006668 A1 | 1/2003 | Lal et al. | |
| 2003/0008186 A1 * | 1/2003 | Dickman et al. | 429/19 |
| 2003/0027022 A1 | 2/2003 | Arana et al. | |
| 2003/0031910 A1 | 2/2003 | Satou et al. | |
| 2003/0031913 A1 | 2/2003 | Pavio et al. | |
| 2003/0057199 A1 | 3/2003 | Villa et al. | |
| 2003/0077490 A1 | 4/2003 | Reinke et al. | |
| 2003/0091502 A1 | 5/2003 | Holladay et al. | |
| 2003/0105172 A1 | 6/2003 | Bowe et al. | |
| 2003/0121906 A1 | 7/2003 | Abbott et al. | |
| 2003/0129464 A1 | 7/2003 | Becerra et al. | |
| 2003/0159354 A1 | 8/2003 | Edlund et al. | |
| 2003/0180216 A1 | 9/2003 | TeGrotenhuis et al. | |
| 2003/0190508 A1 | 10/2003 | Takeyama et al. | |
| 2003/0194363 A1 | 10/2003 | Koripella | |
| 2003/0235529 A1 * | 12/2003 | Hershkowitz et al. | 423/652 |
| 2004/0009381 A1 | 1/2004 | Sakai et al. | |
| 2004/0025784 A1 | 2/2004 | Kawamura et al. | |
| 2004/0028602 A1 | 2/2004 | Franz et al. | |
| 2004/0031592 A1 | 2/2004 | Mathias et al. | |
| 2004/0040281 A1 | 3/2004 | Yamaguchi et al. | |
| 2004/0043263 A1 | 3/2004 | Takeyama et al. | |
| 2004/0043273 A1 | 3/2004 | Jankowksi et al. | |
| 2004/0048128 A1 | 3/2004 | Jankowksi et al. | |
| 2004/0062961 A1 | 4/2004 | Sato et al. | |
| 2004/0063797 A1 | 4/2004 | Aasberg-Petersen et al. | |
| 2004/0065013 A1 | 4/2004 | DeVries | |
| 2004/0105789 A1 | 6/2004 | Yamamoto | |
| 2004/0166385 A1 | 8/2004 | Morse et al. | |
| 2004/0166395 A1 | 8/2004 | Jankowski et al. | |
| 2004/0228211 A1 | 11/2004 | Koripella et al. | |
| 2004/0261379 A1 | 12/2004 | Bruun et al. | |
| 2005/0005521 A1 | 1/2005 | Kaye et al. | |
| 2005/0008909 A1 | 1/2005 | Kaye et al. | |
| 2005/0008911 A1 | 1/2005 | Kaye | |
| 2005/0011125 A1 | 1/2005 | Kaye et al. | |
| 2005/0014040 A1 | 1/2005 | Kaye | |
| 2005/0115889 A1 | 6/2005 | Schaevitz et al. | |
| 2005/0186455 A1 | 8/2005 | Kaye et al. | |
| 2006/0107594 A1 | 5/2006 | Kuwaba | |
| 2006/0127719 A1 | 6/2006 | Brantley et al. | |
| 2006/0134470 A1 | 6/2006 | Kaye et al. | |
| 2008/0118796 A1 | 5/2008 | Brantley et al. | |
| 2008/0305034 A1 * | 12/2008 | Edlund et al. | 423/652 |

FOREIGN PATENT DOCUMENTS

| | | |
|---|---|---|
| JP | 11-106204 | 4/1999 |
| JP | 2003048701 | 2/2003 |
| JP | 2003290649 | 10/2003 |
| JP | 2003290653 | 10/2003 |
| JP | 2003340273 | 12/2003 |
| JP | 2004057920 | 2/2004 |
| WO | WO 00/45457 | 8/2000 |
| WO | WO01/47800 | 7/2001 |
| WO | WO02/19452 | 3/2002 |
| WO | WO 02/059993 | 8/2002 |
| WO | WO 02/093665 | 11/2002 |
| WO | WO 02/103832 | 12/2002 |

(56) References Cited

FOREIGN PATENT DOCUMENTS

| WO | WO 02/103878 | 12/2002 |
|---|---|---|
| WO | WO03/082460 | 10/2003 |
| WO | WO03/083984 | 10/2003 |
| WO | WO 2004/030805 | 4/2004 |
| WO | WO2004/037406 | 5/2004 |

OTHER PUBLICATIONS

A.J. Franz et al., "High Temperature Gas Phase Catalytic and Membrane Reactors", Jun. 1999, Massachusetts Institute of Technology, Cambridge, MA.
A.R. Boccaccini et al., "Electrophoretic Deposition of Nanoceramic Particles onto Electrically Conducting Fibre Fabrics", Sep. 21-24, 1998, 43rd International Scientific Colloquium, Technical University of Ilmenau.
D. Myers et al., "Alternative Water-Gas Shift Catalysts", Jun. 7-8, 2000, 2000 Annual National Laboratory R&D Meeting, DOE Fuel Cells for Transportation Program, Argonne National Laboratory.
D. Prater et al., "Systematic Examination of a Direct Methanol-Hydrogen Peroxide Fuel Cell", Sep. 22, 2011, Swift Enterprises, Ltd., Lafayette, IN.
D.R. Palo et al., "Development of a Solider-Portable Fuel Cell Power System, Part I: A Bread-Board Methanol Fuel Processor", 2002, Journal of Power Sources 108 (2002) 28-34.
Dr. Detlef zur Megede et al., "MFCA Research Document, Complete", Methanol Fuel Cell Alliance, Sep. 2000, 242 pages.
International Search Report dated Jul. 8, 2005, from corresponding International Application No. PCT/US04/20299.
J. Bostaph et al., "1W Direct Methanol Fuel Cell System as a Desktop Charger", Oct. 14, 2002, Motorola Labs, Tempe, AZ.
J. Kaschmitter et al., "Micro-Fabricated Methanol/Water Reformers for Small PEM Fuel Cell Systems", Jul. 21-24, 2003, 8th Electrochemical Power Sources R&D Symposium, Portsmouth, VA.
J. Zalc et al., "Are Noble Metal-Based Water-Gas Shift Catalysts Practical for Automotive Fuel Processing?", 2002, Journal of Catalysis, 206, 169-171.
J. Zizelman et al., "Solid-Oxide Fuel Cell Auxiliary Power Unit: A Paradigm Shift in Electric Supply for Transportation", undated, Delphi Automotive Systems.
J.D. Holladay et al., "Miniature Fuel Processors for Portable Fuel Cell Power Supplies", Nov. 26, 2002, Battelle Pacific Northwest Division, Richland, WA.
K. Brooks et al., "Microchannel Fuel Processing, Fuel Cells for Transportation/Fuels for Fuel Cells", May 6-10, 2002, 2002 Annual Program/Lab R&D Review, Pacific Northwest National Laboratory.
K. Keegan et al., "Analysis for a Planar Solid Oxide Fuel Cell Based Automotive Auxiliary Power Unit", Mar. 4-7, 2002, SAE 2002 World Congress, Detroit, MI.
K. Kempa et al., "Photonic Crystals Based on Periodic Arrays of Algined Carbon Nanotubes", Oct. 3, 2002, Nano Letters 2003, vol. 3, No. 1, 13-18.
M.J. Castaldi et al., "A Compact, Lightweight, Fast-Response Preferential Oxidation Reactor for PEM Automotive Fuel Cell Applications", Sep. 6, 2002, Precision Combustion, Inc., North Haven, CT.
Melissa Funk, "Methanol Fuel Quality Specification Study for Proton Exchange Membrane Fuel Cells, Final Report", XCELLSIS, Feb. 2002, 65 pages.
O. Savadogo et al., Hydrogen/Oxygen Polymer Electrolyte Membrane Fuel Cell (PEMFC) Based on Acid-Doped Polybenzimidazole (PBI), 2000, Journal of New Materials for Electrochemical Systems, 3, 345-349.
Q. Li et al., "The CO Poisoning Effect in PEMFCs Operational at Temperatures up to 200° C.", 2003, Journal of The Electrochemical Society, 150 (12) A1599-A1605.
R. Kumar et al., "Solide Oxide Fuel Cell Research at Argonne National Laboratory", Mar. 29-30, 2001, 2nd Solid State Energy Conversion Alliance Workshop, Arlington, VA.
R. Srinivasan et al., "Micromachined Reactors for Catalytic Partial Oxidation Reactions", Nov. 1997, AIChe Journal, vol. 43, No. 11, 3059-3069.
R.F. Savinell et al., "High Temperature Polymer Electrolyte for PEM Fuel Cells", Sep. 4, 2002, Department of Chemical Engineering, Case Western Reserve University.
S. Ahmed et al., "Catalytic Partial Oxidation Reforming of Hydrocarbon Fuels", Nov. 16-19, 1998, 1998 Fuel Cell Seminar, Palm Springs, CA.
S. Ehrenberg et al., "One Piece Bi-Polar (OPB) Plate with Cold Plate Cooling", Dec. 13, 2002, Session PEM R&D II (2A), Dais Analytic—Rogers.
S. Swartz et al., "Ceria-Based Water-Gas-Shift Catalysts", Aug. 1, 2003, NexTech Materials, Ltd., Wolrthington, OH.
S. Tasic et al., "Multilayer Ceramic Processing of Microreactor Systems", Oct. 14, 2002, Motorola Labs, Tempe, AZ.
S.H. Lee et al., "Removal of Carbon Monoxide from Reformate for Polymer Electrolyte Fuel Cell Application", Nov. 16-19, 1998, 1998 Fuel Cell Seminar, Palm Springs, CA.
S.W. Janson et al., "MEMS, Microengineering and Aerospace Systems", 1999, The American Institute of Aeronautics and Astronautics, Inc.
T.M. Floyd et al., "Liquid-Phase and Multi-Phase Microreactors for Chemical Synthesis", Jun. 1999, Massachusetts Institute of Technology, Cambridge, MA.
TIAX LLC, "Advanced Hydrogen Storage: A System's Perspective and Some Thoughts on Fundamentals", Aug. 14-15, 2002, Presentation for DOE Workshop on Hydrogen Storage, Cambridge, MA.
V. Tomašić et al., "Development of the Structured Catalysts for the Exhaust Gas Treatment", 2001, Chem. Biochem. Eng. Q. 15 (3), 109-115.
W. Ruettinger et al., "A New Generation of Water Gas Shift Catalysts for Fuel Cell Applications", 2003, Journal of Power Sources, 118, 61-65.
Wan et al., "Catalyst Preparation: Catalytic Converter", Feb. 19, 2003, www.insightcentral.net/encatalytic.html.
International Search Report and Written Opinion for corresponding PCT Application No. PCT/US05/46127 dated Oct. 10, 2006.
Notice of Allowance dated Jun. 19, 2007 in U.S. Appl. No. 10/877,767.
Office Action dated Jan. 4, 2007 in U.S. Appl. No. 10/877,767.
Office Action dated Aug. 22, 2007 from U.S. Appl. No. 10/877,804.
Office Action dated Jan. 25, 2008 from U.S. Appl. No. 10/877,804.
Final Rejection dated Jan. 24, 2008 from U.S. Appl. No. 10/877,044.
Office Action dated Dec. 22, 2008 from U.S. Appl. No. 11/772,689.
Office Action dated Aug. 8, 2008 from U.S. Appl. No. 10/877,044.
Office Action dated Jun. 3, 2008 from Indian Patent Application No. 16/KOLNP/2006.
Office Action dated Nov. 6, 2008 in U.S. Appl. No. 11/830,177.
Notice of Allowance dated Sep. 25, 2008 from U.S. Appl. No. 10/877,804.
Conduction General Theory. Efunda, Feb. 2002.
Office Action dated Jun. 10, 2009 in U.S. Appl. No. 11/830,181.
Office Action dated Apr. 29, 2009 from U.S. Appl. No. 11/772,689.
Office Action dated Oct. 28, 2009 in U.S. Appl. No. 12/346,654.
Office Action dated Aug. 18, 2009 in U.S. Appl. No. 11/830,177.
Office Action dated Aug. 5, 2009 in U.S. Appl. No. 12/276,129.
Notice of Allowance dated Jul. 13, 2009 in U.S. Appl. No. 10/877,044.
Office Action dated Feb. 17, 2010 in U.S. Appl. No. 11/830,177.
Office Action dated Dec. 17, 2009 in U.S. Appl. No. 11/830,181.
Office Action dated Dec. 7, 2009 in U.S. Appl. No. 11/772,689.
Office Action dated Jan. 24, 2011 in U.S. Appl. No. 12/897,515.
Office Action in Japanese Application 2006-517622, dated Aug. 17, 2010.
Notice of Allowance dated Jul. 16, 2010 in U.S. Appl. No. 11/772,689.
Notice of Allowance dated Jul. 13, 2010 in U.S. Appl. No. 11/830,181.

* cited by examiner

FUEL PROCESSOR FOR USE WITH PORTABLE FUEL CELLS

CROSS-REFERENCE TO RELATED APPLICATIONS

This application is a divisional of co-pending patent application Ser. No. 11/313,252 filed on Dec. 19, 2005 and entitled "FUEL PROCESSOR FOR USE WITH PORTABLE FUEL CELLS", which a) is a continuation-in-part of U.S. patent application Ser. No. 10/877,044, filed Jun. 25, 2004 and entitled, "ANNULAR FUEL PROCESSOR AND METHODS" now U.S. Pat. No. 7,604,673, which claims priority under 35 U.S.C. §119 (e) from i) U.S. Provisional Patent Application No. 60/482,996 filed on Jun. 27, 2003, and ii) U.S. Provisional Patent Application No. 60/483,416 and filed on Jun. 27, 2003; and b) claims priority under 35 U.S.C. §119(e) from: i) U.S. Provisional Patent Application No. 60/638,421 filed on Dec. 21, 2004 entitled "MICRO FUEL CELL ARCHITECTURE", and ii) U.S. Provisional Patent Application No. 60/649,638 filed on Feb. 2, 2005 entitled "HEAT EFFICIENT MICRO FUEL CELL SYSTEM";

each of the patent applications listed above is incorporated by reference for all purposes.

BACKGROUND OF THE INVENTION

The present invention relates to fuel cell technology. In particular, the invention relates to fuel processors that generate hydrogen and are suitable for use with portable fuel cell systems and portable electronics applications.

A fuel cell electrochemically combines hydrogen and oxygen to produce electricity. The ambient air readily supplies oxygen; hydrogen provision, however, calls for a working supply. The hydrogen supply may include a direct hydrogen supply or a 'reformed' hydrogen supply. A direct hydrogen supply employs a pure source, such as compressed hydrogen in a pressurized container, or a solid-hydrogen storage system, such as a metal-based hydrogen storage device.

A reformed hydrogen supply processes a fuel or fuel source to produce hydrogen. The fuel acts as a hydrogen carrier, is manipulated to separate hydrogen, and may include a hydrocarbon fuel, hydrogen bearing fuel stream, or any other hydrogen fuel such as ammonia. Currently available hydrocarbon fuels include methanol, ethanol, gasoline, propane and natural gas. Liquid fuels offer high energy densities and the ability to be readily stored and transported.

A fuel processor reforms the fuel to produce hydrogen. Commercially available fuel cell systems are still restricted to large-scale applications, such as industrial size generators for electrical power back up. Consumer electronics devices and other portable electrically powered applications currently rely on lithium ion and similar battery technologies. Portable fuel cell systems and fuel processors for portable applications such as electronics offer extended usage sessions and would be desirable, but are not yet available. In addition, techniques that reduce fuel processor size, increase fuel processor efficiency, and/or increase fuel processor reliability would promote commercial viability and would be highly beneficial.

SUMMARY OF THE INVENTION

The present invention relates to a fuel processor that produces hydrogen from a fuel. The fuel processor includes a reformer and a heater. The reformer includes a catalyst that facilitates the production of hydrogen from the fuel; the heater provides heat to the endothermic reformer. Multipass reformer and heater chambers are described that reduce fuel processor size. Single layer fuel processors include reformer and heater chambers in a compact form factor that is well suited for portable applications.

In one embodiment, the present invention places an electrically resistive material (an 'element') in contact with a thermally conductive material (a 'substrate') to heat fuel entering the fuel processor. This is particularly useful during start-up of the fuel processor.

In another embodiment, a fuel processor includes features that facilitate assembly. The features may provide one or both of the following: a) positioning of components to be mated and/or subsequently permanently attached according to a desired relative position between the two components, and b) resistive forces that maintain the desired position between the two components during assembly before permanent attachment is applied, such as an adhesive, bolts or brazing.

In one aspect, the present invention relates to a fuel processor for producing hydrogen from a fuel. The fuel processor includes a reformer that includes a first reformer chamber and a second reformer chamber. The first reformer chamber includes: a first reformer chamber inlet configured to receive the fuel, a catalyst capable of processing the fuel to produce hydrogen, and a first reformer chamber outlet configured to output hydrogen and any unprocessed fuel from the first reformer chamber. The second reformer chamber includes: a second reformer chamber inlet configured, to receive at least a portion of the fuel from the first reformer chamber, a catalyst capable of processing the portion of the fuel from the first reformer chamber to produce hydrogen, and a second reformer chamber outlet configured to output hydrogen from the second reformer chamber. The reformer is configured, such that fuel can flow through the first reformer chamber from the first reformer chamber inlet to the first reformer chamber outlet in a first direction that is about parallel to a second direction that the fuel can flow through the second reformer chamber from the second reformer chamber inlet to the second reformer chamber outlet. The fuel processor also includes a heater configured to provide heat to the reformer. The fuel processor further includes a housing including a set of housing walls that provide external mechanical protection for the reformer and the heater.

In another aspect, the invention relates to an annular fuel processor. The fuel processor includes a burner, boiler, and reformer. The burner includes a burner fuel inlet configured to receive burner fuel and is configured to generate heat using the burner fuel. The boiler includes a boiler fuel inlet configured to receive reformer fuel, and a boiler chamber configured, to receive heat from the burner and to heat the reformer fuel before the reformer receives the reformer fuel. The reformer is configured to receive the reformer fuel from the boiler, includes a catalyst that facilitates the production of hydrogen from the reformer fuel, and is configured to output hydrogen. The reformer is disposed relative to the burner in a cross section such that the reformer surrounds greater than 50 percent of a cross-sectional perimeter for the burner.

In yet another aspect, the invention relates to a fuel processor including a reformer, a catalytic burner configured to provide heat to the reformer by combusting burner fuel provided to the catalytic burner, a boiler, and an electrical heater. The electrical heater heats the burner fuel before receipt of the burner fuel by the burner.

In still another aspect, the invention relates to a method for producing hydrogen in a fuel processor. The method includes turning on an electrical heater; passing fuel over a surface of the electrical heater; and vaporizing at least a portion of the fuel using the electrical heater to generate gaseous fuel. The method also includes providing the gaseous fuel to a burner in the fuel processor and combusting the gaseous fuel in the burner to generate heat. The method further includes transferring at least a portion of the heat from the burner to a reformer included in the fuel processor. Fuel is then provided to the reformer where it is catalytically processed to produce hydrogen.

In another aspect, the invention relates to a fuel processor that eases assembly. The fuel processor includes a reformer, burner, and a housing. At least two components included in the fuel processor are configured to provide a) location relative to each other during assembly and b) coupling to each other during assembly without the use of a permanent form of attachment.

In another aspect, the present invention relates to a fuel processor that comprises a reformer, a burner configured to provide heat to the reformer, and a housing that includes a set of housing walls that provide external mechanical protection for the reformer and the burner. The reformer includes a first reformer chamber and a second reformer chamber. The first reformer chamber includes: a first reformer chamber inlet configured to receive the fuel, a catalyst capable of processing the fuel to produce hydrogen, and a first reformer chamber outlet configured to output hydrogen and any unprocessed fuel from the first reformer chamber. The second, reformer chamber includes: a second reformer chamber including a second reformer chamber inlet configured to receive the fuel, a catalyst capable of processing the fuel to produce hydrogen, and a second, reformer chamber outlet configured to output hydrogen from the second reformer chamber. The burner includes a first burner chamber and a second burner chamber. The first burner chamber includes: a first burner chamber inlet configured to receive the fuel, a catalyst capable of processing the fuel to generate heat, and a first burner chamber outlet configured to output fluids from the first burner chamber. The second burner chamber includes: a second burner chamber inlet configured to receive the fuel, a catalyst capable of processing the fuel to generate heat, and a second burner chamber outlet configured, to output fluids from the second burner chamber.

These and other features of the present invention will be described in the following description of the invention and associated figures.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Fuel Cell System

Figure 1A:
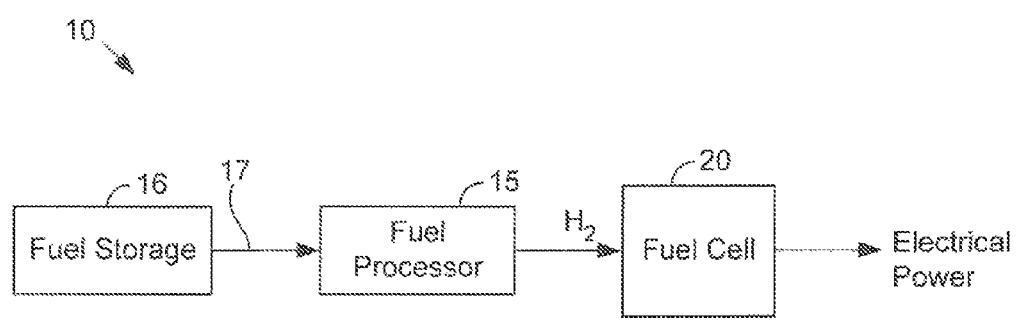
FIG. 1A illustrates a fuel cell package including a fuel processor in accordance with one embodiment of the present invention.

Before expanding upon fuel processors and components included therein, exemplary fuel cell systems will first be described. FIG. 1A illustrates a fuel cell system 10 for producing electrical energy in accordance with one embodiment of the present invention. The 'reformed' hydrogen system 10 processes a fuel 17 to produce hydrogen for supply to fuel cell 20. As shown, the reformed hydrogen supply includes a fuel processor 15 and a fuel storage device 16.

Storage device 16 (or 'cartridge') stores a fuel 17, and may comprise a refillable and/or disposable fuel cartridge. Either design permits recharging capability for a fuel cell system or electronics device by swapping a depleted cartridge for one with fuel. A connector on the cartridge 16 interfaces with a mating connector on an electronics device or portable fuel cell system to permit fuel to be withdrawn from the cartridge. In one embodiment, the cartridge includes a bladder that contains the fuel and conforms to the volume of fuel in the bladder. An outer rigid housing then provides mechanical protection for the bladder. The bladder and housing permit a wide range of portable and non-portable cartridge sizes with fuel capacities ranging from a few milliliters to several liters. In some cases, the cartridge is vented and includes a small hole, single direction flow valve, hydrophobic filter, or other aperture to allow air to enter the fuel cartridge as fuel 17 is consumed and displaced from the cartridge. This type of cartridge allows for "orientation" independent operation since pressure in the bladder remains relatively constant as fuel is displaced. A pump may draw fuel 17 from the fuel storage device 16. Cartridges may also be pressurized with a pressure source such as foam or a propellant internal to the housing that pushes on the bladder (e.g, propane or compressed, nitrogen gas). Other fuel cartridge designs suitable for use herein may include a wick that moves a liquid fuel from locations within a fuel cartridge to a cartridge exit. In another embodiment, the cartridge includes 'smarts', or a digital memory used to store information related to usage of the fuel cartridge.

A pressure source (FIG. 1B) moves the fuel 17 from cartridge 16 to fuel processor 15. Exemplary pressure sources include pumps, pressurized sources internal to the cartridge (such as a compressible foam or spring) that employ a control valve to regulate flow, etc. In one embodiment, a diaphragm pump controls fuel 17 flow from storage device 16. If system 10 is load following, then a control system meters fuel 17 flow to deliver fuel to processor 15 at a flow rate determined, by a required power level output of fuel cell 20 and regulates a controlled item accordingly.

Fuel 17 acts as a carrier for hydrogen and can be processed or manipulated to separate hydrogen. As the terms are used, herein, 'fuel', 'fuel source' and 'hydrogen fuel source' are interchangeable and all refer to any fluid (liquid or gas) that can be manipulated to separate hydrogen. Fuel 17 may include any hydrogen bearing fuel stream, hydrocarbon fuel or other source of hydrogen such as ammonia. Currently available hydrocarbon fuels 17 suitable for use with the present invention include gasoline, C1 to C4 hydrocarbons, their oxygenated analogues and/or their combinations, for example. Other fuel sources may be used with a fuel cell package of the present invention, such as sodium borohydride. Several hydrocarbon and ammonia products may also be used. Liquid fuels 17 offer high energy densities and the ability to be readily stored and shipped.

Fuel 17 may be stored as a fuel mixture. When the fuel processor 15 comprises a steam reformer, for example, storage device 16 includes a fuel mixture of a hydrocarbon fuel and water. Hydrocarbon fuel/water mixtures are frequently represented as a percentage of fuel in water. In one embodiment, fuel 17 comprises methanol or ethanol concentrations in water in the range of 1-99.9%. Other liquid fuels such as butane, propane, gasoline, military grade "JP8", etc. may also be contained in storage device 16 with concentrations in water from 5-100%. In a specific embodiment, fuel 17 comprises 67% methanol by volume.

Fuel processor 15 processes fuel 17 and outputs hydrogen. In one embodiment, a hydrocarbon fuel processor 15 heats and processes a hydrocarbon fuel 17 in the presence of a catalyst to produce hydrogen. Fuel processor 15 comprises a reformer, which is a catalytic device that converts a liquid or gaseous hydrocarbon fuel 17 into hydrogen and carbon dioxide. As the term is used herein, reforming refers to the process of producing hydrogen from a fuel 17. Fuel processor 15 may output either pure hydrogen or a hydrogen bearing gas stream (also commonly referred to as 'reformate').

Various types of reformers are suitable for use in fuel cell system 10; these include steam reformers, auto thermal reformers (ATR) and catalytic partial oxidizers (CPOX) for example. A steam reformer only needs steam and fuel to produce hydrogen. AIR and CPOX reformers mix air with a fuel/steam mixture. ATR and CPOX systems reform fuels such as methanol, diesel, regular unleaded gasoline and other hydrocarbons. In a specific embodiment, storage device 16 provides methanol 17 to fuel processor 15, which reforms the methanol at about 280° C. or less and allows fuel cell system 10 usage in low temperature applications.

Fuel cell 20 electrochemically converts hydrogen and oxygen to water, generating electrical energy (and sometimes heat) in the process. Ambient air readily supplies oxygen. A pure or direct oxygen source may also be used. The water often forms as a vapor, depending on the temperature of fuel cell 20. For some fuel cells, the electrochemical reaction may also produce carbon dioxide as a byproduct.

In one embodiment, fuel cell 20 is a low volume ion conductive membrane (PEM) fuel cell suitable for use with portable applications such as consumer electronics. A PEM fuel cell comprises a membrane electrode assembly (MEA) that carries out the electrical energy generating an electrochemical reaction. The MEA includes a hydrogen catalyst, an oxygen catalyst, and an ion conductive membrane that a) selectively conducts protons and b) electrically isolates the hydrogen catalyst from the oxygen catalyst. A hydrogen gas distribution layer may also be included; it contains the hydrogen catalyst and allows the diffusion of hydrogen therethrough. An oxygen gas distribution layer contains the oxygen catalyst and allows the diffusion of oxygen and hydrogen protons therethrough. Typically, the ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

In one embodiment, a PEM fuel cell includes a fuel cell stack having a set of bi-polar plates. A membrane electrode assembly is disposed between two bi-polar plates. Gaseous hydrogen distribution to the hydrogen gas distribution layer in the MEA occurs via a channel field on one plate while oxygen distribution to the oxygen gas distribution layer in the MES occurs via a channel field on a second plate on the other surface of the membrane electrode assembly.

In one embodiment, each bi-polar plate is formed from a single sheet of metal that includes channel fields on opposite surfaces of the metal sheet. Thickness for these plates is typically below about 5 millimeters, and compact fuel cells for portable applications may employ plates thinner than about 2 millimeters. The single bi-polar plate thus dually distributes hydrogen and oxygen: one channel field distributes hydrogen while a channel field on the opposite surface distributes oxygen. Multiple bi-polar plates can be stacked to produce the 'fuel cell stack' in which a membrane electrode assembly is disposed between each pair of adjacent bi-polar plates. In another embodiment, each bi-polar plate is formed from multiple layers that include more than one sheet of metal.

In electrical terms, the anode includes the hydrogen gas distribution layer, hydrogen catalyst and a bi-polar plate. The anode acts as the negative electrode for fuel cell 20 and conducts electrons that are freed from hydrogen molecules so that they can be used externally, e.g., to power an external circuit or stored in a battery. In electrical terms, the cathode includes the oxygen gas distribution layer, oxygen catalyst and an adjacent bi-polar plate. The cathode represents the positive electrode for fuel cell 20 and conducts the electrons back from the external electrical circuit to the oxygen catalyst, where they can recombine with hydrogen ions and oxygen to form water.

In a fuel cell stack, the assembled bi-polar plates are connected in series to add electrical potential gained in each layer of the stack. The term 'bi-polar' refers electrically to a bi-polar plate (whether comprised of one plate or two plates) sandwiched between two membrane electrode assembly layers. In a stack where plates are connected in series, a bi-polar plate acts as both a negative terminal for one adjacent (e.g., above) membrane electrode assembly and a positive terminal for a second adjacent (e.g., below) membrane electrode assembly arranged on the opposite surface of the bi-polar plate.

In a PEM fuel cell, the hydrogen catalyst separates the hydrogen into protons and electrons. The ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electrical energy is produced) or battery (energy is stored). Meanwhile, protons move through the ion conductive membrane. The protons and used electrons subsequently meet on the cathode side, and combine with oxygen to form water. The oxygen catalyst in the oxygen gas distribution layer facilitates this reaction. One common oxygen catalyst comprises platinum powder very thinly coated, onto a carbon paper or cloth. Many designs employ a rough and porous catalyst to increase surface area of the platinum exposed to the hydrogen and oxygen.

Since the electrical generation process in fuel cell 20 is exothermic, fuel cell 20 may implement a thermal management system to dissipate heat. Fuel cell 20 may also employ a number of humidification plates (HP) to manage moisture levels in the fuel cell.

While the present invention will mainly be discussed with respect to PEM fuel cells, it is understood that the present invention may be practiced with other fuel cell architectures. The main difference between fuel cell architectures is the type of ion conductive membrane used. In another embodiment, fuel cell 20 is phosphoric acid fuel cell that employs liquid phosphoric acid for ion exchange. Solid oxide fuel cells employ a hard, non-porous ceramic compound, for ion exchange and may be suitable for use with the present invention. Generally, any fuel cell architecture may be applicable to the fuel processors described herein that output hydrogen for a fuel cell. Other such fuel cell architectures include alkaline and molten carbonate fuel cells, for example.

Figure 1B:
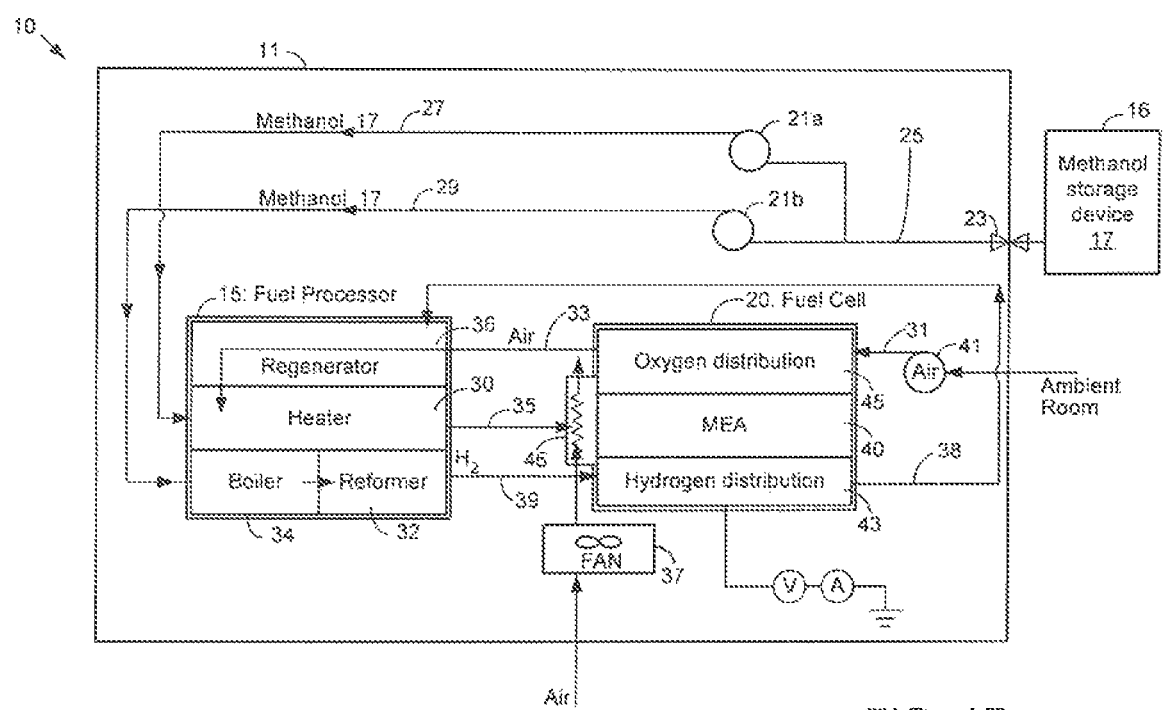
FIG. 1B illustrates schematic operation for the fuel cell package of FIG. 1A in accordance with a specific embodiment of the present invention.

FIG. 1B illustrates schematic operation for the fuel cell system 10 of FIG. 1A in accordance with a specific embodiment of the present invention.

Fuel storage device 16 stores methanol or a methanol mixture as a hydrogen fuel 17. An outlet of storage device 16 includes a connector 23 that mates with a mating connector on a package 11. In this case, the package 11 includes the fuel cell 20, fuel processor 15, and all other components except the cartridge 16. In a specific embodiment, the connector 23 and mating connector form a quick connect/disconnect for easy replacement of cartridges 16. The mating connector communicates methanol 17 into hydrogen fuel line 25, which is internal to package 11 in this case.

Line 25 divides into two lines: a first line 27 that transports methanol 17 to a heater/burner 30 for fuel processor 15 and a second line 29 that transports methanol 17 to a reformer 32 in fuel processor 15. Lines 25, 27 and 29 may comprise channels disposed in the fuel processor (e.g., channels in metals components) and/or tubes leading thereto.

Flow control is provided on each line 27 and 29. Separate pumps 21a and 21b are provided for lines 27 and 29, respectively, to pressurize each line separately and transfer methanol at independent rates, if desired. A model 030SP-S6112 pump as provided by Biochem, NJ is suitable to transmit liquid methanol on either line in a specific embodiment. A diaphragm or piezoelectric pump is also suitable for use with system 10. A flow restriction may also provided on each line 27 and 29 to facilitate sensor feedback and flow rate control. In conjunction with suitable control, such as digital control applied by a processor that implements instructions from stored software, each pump 21 responds to control signals from the processor and moves a desired amount of methanol 17 from storage device 16 to burner 30 and reformer 32 on each line 27 and 29. In another specific embodiment shown, line 29 runs inlet methanol 17 across or through a heat exchanger (not shown) that receives heat from the exhaust of the heater 30 in fuel processor 15. This increases thermal efficiency for system 10 by preheating the incoming fuel (to reduce heating of the fuel in burner 30) and recuperates heat that would, otherwise be expended from the system.

Air source 41 delivers oxygen and air from the ambient room through line 31 to the cathode in fuel cell 20, where some oxygen is used in the cathode to generate electricity. Air source 41 may include a pump, fan, blower or compressor, for example. High operating temperatures in fuel cell 20 also heat the oxygen and air.

In the embodiment shown, the heated oxygen and air is then transmitted from the fuel cell via line 33 to a regenerator 36 (also referred to herein as a 'dewar') of fuel processor 15, where the air is additionally heated (by the heater, while in the dewar—see below) before entering heater 30. This double pre-hearing increases efficiency of the fuel cell system 10 by a) reducing heat lost to reactants in heater 30 (such as fresh oxygen that would otherwise be near room temperature when combusted, in the heater), and b) cooling the fuel cell during energy production. In this embodiment, a model BTC compressor as provided by Hargraves, N.C. is suitable to pressurize oxygen and air for fuel cell system 10.

A fan 37 blows cooling air (e.g., from the ambient room) over fuel cell 20. Fan 37 may be suitably sized to move air as desired by heating requirements of the fuel cell; and many vendors known to those of skill in the art provide fans suitable for use with package 10.

Fuel processor 15 receives methanol 17 and outputs hydrogen. Fuel processor 15 comprises heater 30, reformer 32, boiler 34 and regenerator 36. Heater (also referred, to herein as a burner) 30 includes an inlet that receives methanol 17 from line 27 and a catalyst that helps generate heat from methanol. In another embodiment, heater 30 also includes its own boiler to preheat fuel for the heater.

Boiler 34 includes a boiler chamber (shown in cross section and extending along monolithic structure 100) having an inlet that receives methanol 17 from line 29. The boiler chamber is configured to receive heat from burner 30, via heat conduction through walls in monolithic structure 100 between the boiler 34 and burner 30, and use the heat to boil the methanol passing through the boiler chamber. The structure of boiler 34 permits heat produced in heater 30 to heat methanol 17 in boiler 34 before reformer 32 receives the methanol 17. In a specific embodiment, the boiler chamber is sized to boil methanol before receipt by reformer 32. Boiler 34 includes an outlet that provides heated methanol 17 to reformer 32.

Reformer 32 includes an inlet that receives heated methanol 17 from boiler 34. A catalyst in reformer 32 reacts with the methanol 17 to produce hydrogen and carbon dioxide; this reaction is slightly endothermic and draws heat from heater 30. A hydrogen outlet of reformer 32 outputs hydrogen to line 39. In one embodiment, fuel processor 15 also includes a preferential oxidizer that intercepts reformer 32 hydrogen exhaust and decreases the amount of carbon monoxide in the exhaust. The preferential oxidizer employs oxygen from an air inlet to the preferential oxidizer and a catalyst, such as ruthenium or platinum that is preferential to carbon monoxide over hydrogen.

Regenerator 36 pre-heats incoming air before the air enters heater 30. In one sense, regenerator 36 uses outward traveling waste heat in fuel processor 15 to increase thermal management and thermal efficiency of the fuel processor. Specifically, waste heat from heater 30 pre-heats incoming air provided to heater 30 to reduce heat transfer to the air within the heater. As a result, more heat transfers from the heater to reformer 32. The regenerator also functions as insulation for the fuel processor. More specifically, by reducing the overall amount of heat loss from the fuel processor, regenerator 36 also reduces heat loss from package 10 by heating air before the heat escapes fuel processor 15. This reduces heat loss from fuel processor 15, which enables cooler fuel cell system 10 packages.

Line 39 transports hydrogen (or 'reformate') from fuel processor 15 to fuel cell 20. In a specific embodiment, gaseous delivery lines 33, 35 and 39 include channels in a metal interconnect that couple to both fuel processor 15 and fuel cell 20. A hydrogen flow sensor (not shown) may also be added on line 39 to detect and communicate the amount of hydrogen being delivered to fuel cell 20. In conjunction with the hydrogen flow sensor and suitable control, such as digital control applied by a processor that implements instructions from stored, software, fuel processor 15 regulates hydrogen gas provision to fuel cell 20.

Fuel cell 20 includes a hydrogen inlet port that receives hydrogen from line 39 and includes a hydrogen intake manifold that delivers the gas to one or more bi-polar plates and their hydrogen distribution channels. An oxygen inlet, port of fuel cell 20 receives oxygen from line 31; an oxygen intake manifold, receives the oxygen from the port and delivers the oxygen to one or more bi-polar plates and their oxygen distribution channels. A cathode exhaust manifold collects gases from the oxygen distribution channels and delivers them to a cathode exhaust port and line 33, or to the ambient room. An anode exhaust manifold 38 collects gases from the hydrogen distribution channels and delivers them to the ambient room.

In the embodiment shown, the anode exhaust is piped back to fuel processor 15. In this case, system 10 comprises plumbing 38 that transports unused hydrogen from the anode exhaust to burner 30. For system 10, burner 30 includes two inlets: an inlet configured to receive fuel 17 and an inlet configured to receive hydrogen from line 38. In one embodiment, gaseous delivery in line 38 back to fuel processor 15 relies on pressure at the exhaust of the anode gas distribution channels, e.g., in the anode exhaust manifold. In another embodiment, an anode recycling pump or fan is added to line 38 to pressurize the line and return unused, hydrogen back to fuel processor 15.

In one embodiment, fuel cell 20 includes one or more heat transfer appendages 46 that permit conductive heat transfer with internal portions of a fuel cell stack. In a specific heating embodiment as shown, exhaust of the heater 30 in fuel processor 15 is transported to the one or more heat transfer appendages 46 in fuel cell 20 during system start-up to expedite reaching initial elevated, operating temperatures in the fuel cell 20. In a specific cooling embodiment, an additional fan 37 blows cooling air over the one or more heat transfer appendages 46, which provides dedicated and controllable cooling of the stack during electrical energy production.

In addition to the components shown in shown in FIG. 1B, system 10 may also include other elements such as electronic controls, additional pumps and valves, added system sensors, manifolds, heat exchangers and electrical interconnects useful for carrying out functionality of a fuel cell system 10 that are known to one of skill in the art and omitted for sake of brevity. FIG. 1B shows one specific plumbing arrangement for a fuel cell system; other plumbing arrangements are suitable for use herein. For example, the heat transfer appendages 46, a heat exchanger and dewar 36 need not be included. Other alterations to system 10 are permissible, as one of skill in the art will appreciate.

Fuel processors of the present invention are well suited for use with micro fuel cell systems. A micro fuel cell system generates dc voltage, and may be used in a wide variety of applications. For example, electrical energy generated by a micro fuel cell may power a notebook computer 11 or an electronics device 11 carried by military personnel. In one embodiment, the present invention provides 'small' fuel cells that are configured to output less than 200 watts of power (net or total). Fuel cells of this size are commonly referred to as 'micro fuel cells' and are well suited for use with portable electronics devices. In one embodiment, the fuel cell is configured to generate from about 1 milliwatt to about 200 Watts. In another embodiment, the fuel cell generates from about 5 Watts to about 60 Watts. Fuel cell system 10 may be a stand-alone system, which is a single package 11 that produces power as long as it has access to a) oxygen and b) hydrogen or a hydrogen source such as a hydrocarbon fuel. One specific portable fuel cell package produces about 20 Watts or about 45 Watts, depending on the number of cells in the stack.

Fuel Processor

Figure 2A:
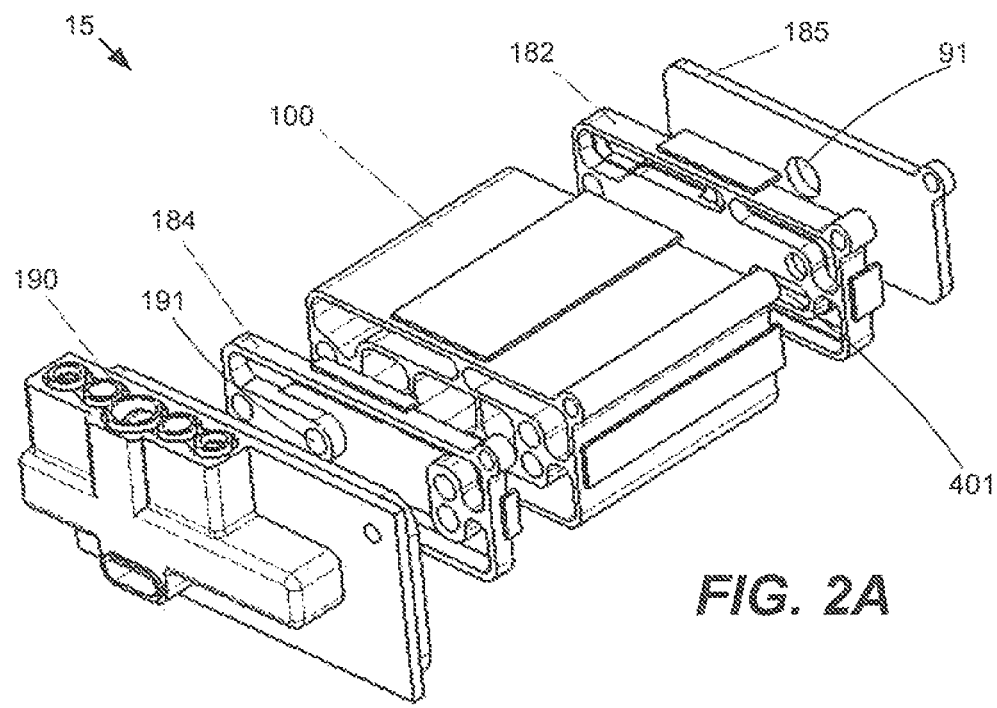
FIG. 2A illustrates a top perspective view of a fuel processor in accordance with one embodiment of the present invention.
Figure 2B:
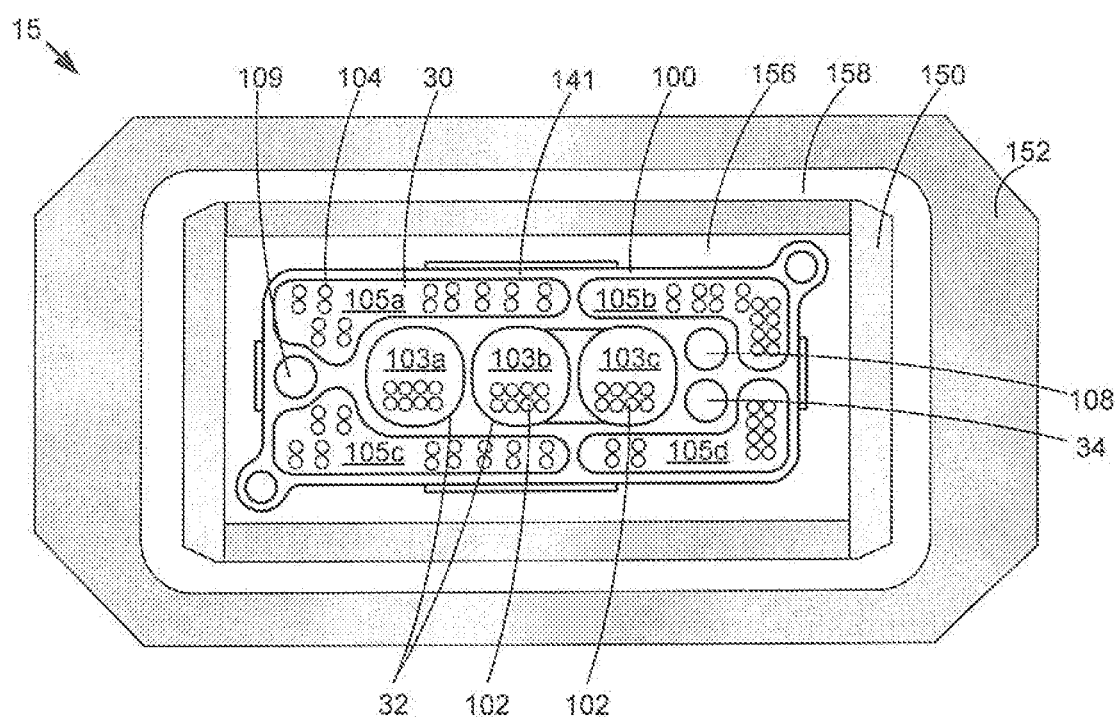
FIG. 2B illustrates a cross-sectional front view of the fuel processor of FIG. 2A.

FIG. 2A illustrates a top perspective view of components included in a fuel processor 15 in accordance with one embodiment of the present invention. FIG. 2B illustrates a cross-sectional front view of a central portion of fuel processor 15. Fuel processor 15 reforms methanol to produce hydrogen. Fuel processor 15 includes monolithic structure 100, end plates 182 and 184, end plate 185, reformer 32, heater 30, boiler 34, boiler 108, dewar 150 and housing 152. Although the present invention will now be described with respect to methanol consumption for hydrogen production, it is understood that fuel processors of the present invention may consume another fuel, such as one of the fuels listed above.

Referring initially to FIG. 2B, monolithic structure 100 includes reformer 32, burner 30, boiler 34 and boiler 108. As the term is used herein, 'monolithic' refers to a single and integrated structure. The structure may include one or more materials that permit conductive heat transfer within the fuel processor. Monolithic structure 100 comprises a single material 141, where holes and space in the material 141 form reformer 32, burner 30, boiler 34 and boiler 108. The monolithic structure 100 and common material 141 simplify manufacture of fuel processor 15. For example, using a metal for common material 141 allows monolithic structure 100 to be formed by extrusion to shape reformer 32, burner 30, boiler 34 and boiler 108. In a specific embodiment, monolithic structure 100 is consistent in cross sectional dimensions between end plates 182 and 184 and solely comprises copper formed in a single extrusion.

Outside monolithic structure 100, fuel processor 15 includes plumbing inlets and outlets for reformer 32, burner 30 and boiler 34 disposed on end plates 182 and 184 and interconnect 190, which will be described in further detail below.

Housing 152 (FIG. 3B) provides mechanical protection for internal components of fuel processor 15 such as monolithic structure 100. Housing 152 also provides separation from the environment external to processor 15 and may include inlet and outlet ports for gaseous and liquid, communication in and out of fuel processor 15. In this case, housing 152 includes a set of walls that at least partially contain a dewar 150. The housing walls may include a suitably stiff material such as a metal or a rigid polymer, for example.

Boiler 34 pre-heats methanol for reformer 32. Boiler 34 receives methanol via a fuel inlet on interconnect 190, which couples to a methanol supply line 27 (FIG. 1B). Since methanol reforming and hydrogen production via a catalyst 102 in reformer 32 often requires elevated methanol temperatures, fuel processor 15 pre-heats the methanol before receipt by reformer 32 via boiler 34. As shown in the cross section of FIG. 2B, boiler 34 is disposed in proximity to burner 30 to receive heat generated in burner 30. The heat transfers via conduction through material 141 in monolithic structure 100 from burner 30 to boiler 34 and via convection from boiler 34 walls to the methanol passing therethrough. In one embodiment, boiler 34 is configured to vaporize liquid methanol. Boiler 34 then passes the gaseous methanol to reformer 32 for gaseous interaction with catalyst 102.

Reformer 32 is configured to receive methanol from boiler 34. Internal walls in monolithic structure 100 and end walls on end plates 182 and 184 define dimensions for one or more reformer chambers 103. In one embodiment, end plate 182 and/or end plate 184 includes a channel that routes heated methanol exhausted from boiler 34 into reformer 32.

In one embodiment, a reformer includes a multi-pass arrangement that has multiple reformer chambers 103. As shown in FIGS. 2A and 2B, reformer 32 includes three multi-pass chambers that process methanol in series: a first reformer chamber 103a, a second reformer chamber 103b, and third reformer chamber 103c. Reformer 32 then includes the volume of all three chambers 103a-c. Each chamber traverses the length of monolithic structure 100, and opens to each other in series such that chambers 103a-c form one contiguous path for gaseous flow. More specifically, heated and gaseous methanol from boiler 34 a) enters reformer chamber 103a at an inlet end of monolithic structure 100 and can flow to the other end of structure 100 and over catalyst 102 in chamber 103a, b) then flows into second reformer chamber 103b at the second end of monolithic structure 100 and flows over catalyst 102 in chamber 103b from one end of monolithic structure 100 to the other, and c) flows into reformer chamber 103c at one end of monolithic structure 100 and flows to the other end over catalyst 102 in chamber 103c. Multi-pass arrangements will be described in further detail below.

Reformer 32 includes a catalyst 102 that facilitates the production of hydrogen. Catalyst 102 reacts with methanol and produces hydrogen gas and carbon dioxide. In one embodiment, catalyst 102 comprises pellets packed to form a porous bed or otherwise suitably filled into the volume of reformer chamber 103. Pellet diameters ranging from about 50 microns to about 1.5 millimeters are suitable for many applications. Pellet diameters ranging from about 500 microns to about 1 millimeter are suitable for use with reformer 32. Pellet sizes may be varied relative to the cross sectional size of reformer chambers 103a-c, e.g., as the reformer chambers increase in size so does catalyst 102 pellet diameters. Pellet sizes and packing may also be varied to control the pressure drop that occurs through reformer 32 or each reformer chamber 103. In one embodiment, pressure drops from about 0.2 to about 3.5 psi gauge are suitable between the inlet and outlet of each reformer chamber 103. One suitable catalyst 102 may include CuZn coated onto alumina pellets when methanol is used as a hydrocarbon fuel 17. Other materials suitable for catalyst 102 include platinum, palladium, a platinum/palladium mix, nickel, and other precious metal catalysts for example. Catalyst 102 pellets are commercially available from a number of vendors known to those of skill in the art. Catalyst 102 may also comprise catalyst materials listed above coated onto a metal sponge or metal foam. A wash coat of the desired metal catalyst material onto the walls of reformer chamber 103 may also be used with reformer 32.

Reformer 32 is configured to output hydrogen and includes an outlet port 191 (FIG. 2A) that communicates hydrogen produced in reformer 32 outside of fuel processor 15. Port 191 is disposed on a wall of end plate 184 and includes a hole that passes through the wall. Port 191 opens to hydrogen line in interconnect 190, which then forms part of a hydrogen provision line 39 (FIG. 1B) for transfer of the hydrogen to fuel cell 20 for electrical energy generation.

Hydrogen production in reformer 32 is slightly endothermic and draws heat from heater/burner 30. In the embodiment shown, burner 30 employs catalytic combustion to generate heat. As the term is used herein, a burner refers to a heater that uses a catalytic process to produce heat. A heater refers to any mechanism or system for producing heat in a fuel processor. A fuel processor of the present invention may alternatively employ an electrical mechanism that, for example, uses electrical resistance and electrical energy to produce heat. Although fuel processor 15 is mainly discussed with respect to a chemical-based heater/burner 30, the fuel processor may alternatively include other sources of heat.

As shown in FIG. 2B, catalytic heater 30 comprises four burner chambers 105a-d that surround, reformer 32 in cross section. A catalyst 104 disposed in each burner chamber 105 helps a burner fuel passed through the chamber generate heat. Burner 30 includes an inlet that receives methanol 17 from boiler 108 via a channel in one of end plates 182 or 184. In one embodiment, methanol produces heat in burner 30 and catalyst 104 facilitates the methanol production of heat. In another embodiment, waste hydrogen from fuel cell 20 produces heat in the presence of catalyst 104. Suitable burner catalysts 104 may include platinum or palladium coated onto alumina pellets for example. Other materials suitable for catalyst 104 include iron, tin oxide, other noble-metal catalysts, reducible oxides, and mixtures thereof. Catalyst 104 is commercially available from a number of vendors known to those of skill in the art as small pellets. The pellets may be packed into burner chamber 105 to form a porous bed or otherwise suitably filled into the burner chamber volume. Catalyst 104 pellet sizes may be varied, relative to the cross sectional size of burner chamber 105. Catalyst 104 may also comprise catalyst materials listed above coated onto a metal sponge or metal foam or wash coated onto the walls of burner chamber 105.

Some fuels generate additional heat in burner 30 or generate heat more efficiently with elevated temperatures. Fuel processor 15 includes a boiler 108 that heats methanol before burner 30 receives the fuel. Boiler 108 is disposed in proximity to burner 30 to receive heat generated in burner 30; the heat transfers via conduction through monolithic structure 100 from burner 30 to boiler 108 and via convection from boiler 108 walls to the methanol passing therethrough.

Figure 15A:
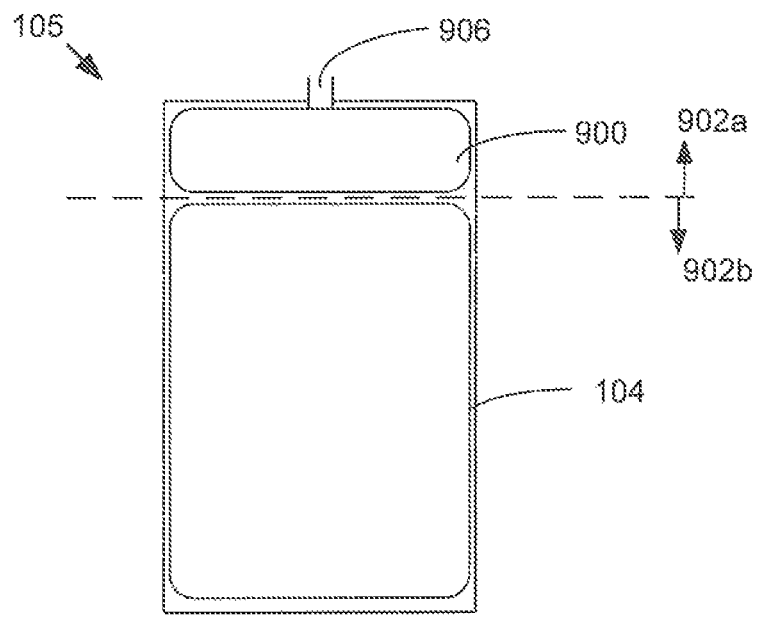
FIGS. 15A and 15B show a fuel vaporizer internal to a burner chamber in accordance with another embodiment of the present invention.
Figure 15B:
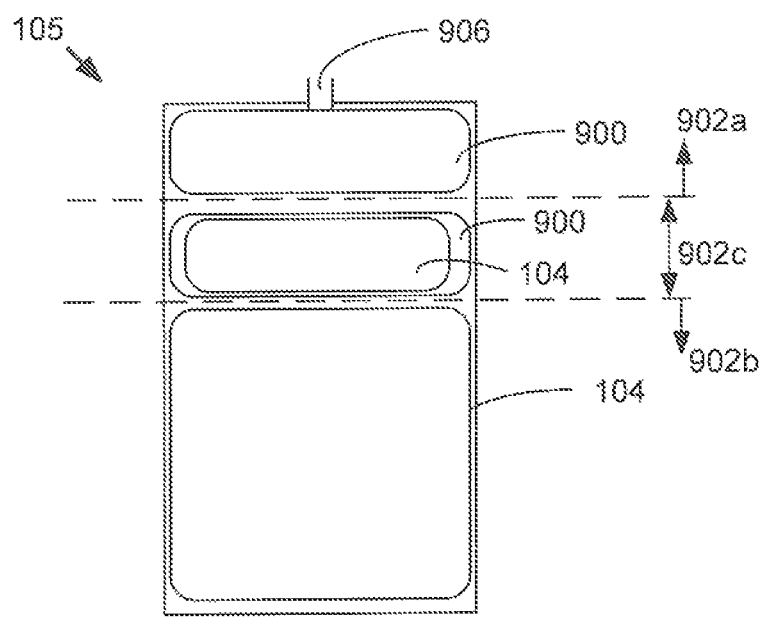

In another embodiment, fuel processor 15 does not include a separate boiler 108 and includes a solid vaporizer at the inlet of one or more burner chambers. FIGS. 15A and 15B show a fuel vaporizer 900 internal to a burner chamber 105 in accordance with another embodiment of the present invention. Burner chamber 105 of FIG. 15A includes two zones: zone 902a that includes the solid vaporizer 900 and a zone 902b that includes the burner catalyst 104. Gaseous or liquid fuel enters the burner chamber 105 via inlet 906.

Fuel vaporizer 900 includes a chemically inert material that heats up and transfers the heat to the fuel. Vaporizer 900 is disposed near an inlet 906 of burner chamber 105 so as to intercept, heat and at least partially vaporize fuel as it enters the burner chamber. For FIG. 15A, the fuel is vaporized, before the fuel reaches catalyst 104. The embodiment shown in FIG. 15B includes a mixed zone 902c that includes both a vaporizer and catalyst 104. In this case, vaporizer 900 partially mixes with burner catalyst 104 in zone 902c.

When the fuel processor reaches operating temperatures, liquid fuel may then be provided directly to burner chamber 105 without need for a boiler. The hot vaporizer 900 then converts the liquid fuel to a gas for interaction with burner catalyst 104. Vaporizer 900 also disperses the vaporized fuel, eliminates condensation of the vaporized fuel on the burner catalyst 104, and captures latent heat in this portion of the fuel processor to heat the fuel. Vaporizer 900 permits the fuel to be heated directly at source of heat (the burner), reduces volume of fuel processor 15, and eliminates a pressure drop associated with the burner.

In one embodiment, vaporizer 900 includes balls or small structures made of materials such as ceramic, alumina, glass or another metal. Ceramic balls, alumina beads, glass beads and metal shots are useful for many fuel processors. Materials having a high thermal conductivity such as copper also expedite heat transfer. In one embodiment, the vaporizer 900 particles include about the same particle size as the burner catalyst 104, and include sufficient particle size or diameter for complete dispersion of a vaporized fuel.

Air including oxygen enters fuel processor 15 via an air inlet port 191 in interconnect 190. Burner 30 uses the oxygen for catalytic combustion of methanol.

Burner 30 typically operates at an elevated temperature. In one embodiment, fuel processor 15 comprises a dewar 150 to improve thermal management for fuel processor 15. Dewar 150 at least partially thermally isolates components internal to housing 152—such as burner 30- and contains heat within fuel processor 15. Dewar 150 is shaped and sized to form two sets of air chambers/channels: a first air chamber 156 between the outside of monolithic structure 100 and the inside of dewar 150; and a second air chamber 158 between the outside of dewar 150 and the inside of housing 152. The chambers 156 and 158 include spaces for airflow and regenerative cooling. More specifically, dewar 150 is configured such that air passing through dewar chambers 156 and 158 receives heat generated in burner 30. Air is routed through one or both channels 156 and 158 to improve thermal heat management for fuel processor 15 by: a) allowing incoming air to be pre-heated before entering burner 30, and b) dissipating waste heat generated by burner 32 into the incoming air before the heat reaches the outside of housing 152. Dewar 150 offers thus two functions for fuel processor 15: a) it permits active cooling of components of fuel processor 15 before the heat reaches an outer portion of the fuel processor, and b) it pre-heats the air going to burner 30 to improve thermal efficiency.

In one embodiment, the fuel cell system runs anode exhaust from the fuel cell 20 back to fuel processor. As shown in FIG. 1B, line 38 routes unused hydrogen from fuel cell 20 to a burner inlet, which provides the anode exhaust to burner 30 (or to the regenerator 36 and then to burner inlet 109 and into burner 30). Burner 30 includes a thermal catalyst that reacts with the unused hydrogen to produce heat. Since hydrogen consumption within a PEM fuel cell 20 is often incomplete and the anode exhaust often includes unused hydrogen, re-routing the anode exhaust to burner 30 allows a fuel cell system to capitalize on unused hydrogen and increase hydrogen usage and energy efficiency. The fuel cell system thus provides flexibility to use different fuels in a catalytic burner 30. For example, if fuel cell 20 can reliably and efficiently consume over 90% of the hydrogen in the anode stream, then there may not be sufficient hydrogen to maintain reformer and boiler operating temperatures in fuel processor 15. Under this circumstance, methanol supply is increased to produce additional heat to maintain the reformer and boiler temperatures.

Burner inlet 109 traverses monolithic structure 100 and carries anode exhaust from fuel cell 20 before provision into burner 30. Disposing burner inlet 109 adjacent to a burner chamber 105 also heats the incoming anode exhaust, which reduces heat transferred to the anode exhaust within the burner chambers 105.

In another embodiment, the fuel cell system runs a heating medium from fuel processor 15 to fuel cell 20 to provide heat to fuel cell 20. In this case, the fuel cell system includes plumbing configured to transport the heating medium from fuel processor 15 to fuel cell 20. In a specific embodiment, line 35 transports heated gases to fan 37, which moves the heated, gases within fuel cell 20 and across the fuel cell stack and heat transfer appendages (FIG. 1B). Alternatively, the plumbing may be configured to transport the heating medium from burner 30 directly to one or more heat transfer appendages 46. In this case, line 35 may continue through the fuel cell housing and open in the proximity of one or more heat transfer appendages. A hole in the fuel cell housing then allows line 35 to pass therethrough or connect to a port that communicates the gases to plumbing inside the fuel cell for delivery to the fuel cell stack and heat transfer appendage. For catalytic heat generation in fuel cell 20, the plumbing may also transport the heating medium to facilitate gaseous interaction with a catalyst, such as plumbing delivery to one or more bulkheads that contain the catalyst proximate to the fuel cell or heat transfer appendages 46. As the term is used herein, plumbing may comprise any tubing, piping and/or channeling (e.g., in interconnect 190 and the fuel cell) that communicates a gas or liquid from one location to a second location. The plumbing may also comprise one or more valves, gates or other devices to facilitate and control flow.

In one embodiment, the heating medium comprises heated gases exhausted from burner 30. A catalytic burner or electrical resistance burner operates at elevated temperatures. Air exhausted from an electric burner or product gases exhausted from a catalytic burner are often greater than about 100 degrees Celsius when the gases leave the fuel processor. For many catalytic burners, depending on the fuel employed, the heating medium is commonly greater than about 200 degrees Celsius when the heating medium leaves the fuel processor. These heated gases are transported to the fuel cell for convective heat transfer in the fuel cell, such as passing the heated gases over one or more heat transfer appendages 46 for convective heat transfer from the warmer gases into the cooler heat transfer appendages.

In another embodiment, burner 30 is a catalytic burner and the heating medium comprises the fuel. Catalytic combustion in burner 30 is often incomplete and the burner exhaust gases include unused and gaseous methanol. Fuel cell 20 then comprises a thermal catalyst that facilitates production of heat in the fuel cell in the presence of methanol. The fuel is typically vaporized prior to reaching the burner to facilitate catalytic combustion. In this case, line 35 transports the gaseous and unused methanol to the thermal catalyst in fuel cell 20. Suitable methanol catalysts, such as platinum or palladium coated onto alumina pellets, are also described above with respect to catalyst 104 in burner 30. Several suitable thermal catalyst arrangements for transferring heat into heat transfer appendages 46 include wash coating the catalyst onto the heat transfer appendages 46 or forming bulkheads that physically contain the catalyst but allow the exhaust to pass over the catalyst. Several suitable examples are described in commonly owned and co-pending patent application Ser. No. 10/877,771 and entitled "EFFICIENT MICRO FUEL CELL SYSTEMS AND METHODS", which is incorporated by reference herein in its entirety for all purposes.

In one embodiment, the heating medium is transported to the fuel cell during a start-up period before the fuel cell begins generating electrical energy, e.g., in response to a request for electrical energy. Heating a fuel cell in this manner allows fuel cell component operating temperatures to be reached sooner and expedites warm-up time needed when initially turning on fuel cell 20.

In another embodiment, the heating medium is transported from the fuel processor to the fuel cell during a period of non-activity in which the fuel cell does not generate electrical energy and the component cools. Since many fuel cells require elevated temperatures for operation and the electrical energy generating process is exothermic, the fuel cell usually does not require external heating during electrical energy generation. However, when electrical energy generation ceases for an extended time and the component drops below a threshold operating temperature, the heating medium may then be transported from the fuel processor to regain the operating temperature and resume electrical energy generation. This permits operating temperatures in a fuel cell to be maintained when electrical energy is not being generated by the fuel cell.

Fuel processors described herein include voluminous reformer and burner chambers. In one embodiment, a burner or reformer chamber employs a substantially quadrilateral or non-quadrilateral cross-sectional shape that with depth provides a volume for each chamber having significant dimensions in all three-dimensions. A non-quadrilateral burner 304 may employ cross-sectional geometries with more or less sides, an elliptical shape, and more complex cross-sectional shapes. As shown in FIG. 2A, each reformer chamber includes a four-sided cross-sectional shape with rounded corners. Other voluminous reformer and burner chambers are shown and described below.

Reformer and burner chambers may be characterized by a cross-sectional width and a cross-sectional height. A maximum horizontal distance between inner walls of a reformer or burner chamber quantifies its cross-sectional width. A maximum vertical distance between inner walls of a reformer or burner chamber quantifies its cross-sectional height. In one embodiment, a cross-sectional height for a reformer or burner chamber is greater than one-third the cross-sectional width. This height/width relationship increases the volume of a reformer or burner chamber for a given fuel processor. In another embodiment, the cross-sectional height is greater than one-half cross-sectional width. In another embodiment, cross-sectional height is greater than the cross-sectional width. Other cross-sectional aspect ratios are also suitable for use with fuel processors described herein.

A fuel cell package may include other fuel processor designs. Many architectures employ a planar reformer disposed on top or below to a planar burner. Micro-channel designs fabricated in silicon that commonly employ such stacked planar architectures may be used. Other fuel processors may be used that process fuels other than methanol. Fuels other than methanol were listed above, and processors for these fuels are not detailed herein for sake of brevity.

Interconnect 190 is disposed at least partially between fuel cell 20 and fuel processor 15, and forms a structural and plumbing intermediary between the two. One or more conduits traverse interconnect 190 and permit gaseous and/or fluid communication between the fuel cell and the fuel processor. The interconnect 190 also reduces plumbing complexity and space, which leads to a smaller fuel cell system package. The interconnect 190 includes a set of conduits, formed in the structure of the interconnect 190, that each communicate a liquid or gas between the fuel processor and the fuel cell.

Interconnect 190 may include one or more materials. In one embodiment, interconnect 190 is constructed from a suitably rigid, material that adds structural integrity to a fuel cell package and provides rigid connectivity between a fuel cell and fuel processor. Many metals are suitable for use with interconnect 190.

Interconnect 190 includes plumbing for communicating any number of gases and liquids between a fuel cell and fuel processor. For the fuel cell system 10 of FIG. 1C, plumbing serviced by interconnect 190 includes 1) a hydrogen line 39 from the fuel processor to the fuel cell, 2) a line 38 returning unused hydrogen from the fuel cell back to the fuel processor, 3) an oxygen line 33 from the fuel cell to the fuel processor, and 4) a reformer or burner exhaust line 37 traveling from the fuel processor to the fuel cell. Other gas or liquid transfers between a fuel cell and fuel processor, in either direction, may be serviced by interconnect 190. In one embodiment, interconnect 190 internally incorporates all plumbing for gases and liquids it transfers to minimize exposed tubing and package size.

Having discussed, an overview of fuel cell systems and fuel processors, additional detail on various embodiments of the present invention will now be provided.

Multipass Reformer

Dimensions for a traditional, linear and single pass chamber may be described, by a length, L, and a cross-sectional dimension along the length, such as an inner diameter, d (or width and height). Usually, the ratio of L/d is greater than one. Some fuel processors include a relatively large L/d ratio. In general, decreasing the ratio decreases hydrogen production, while increasing the ratio increases hydrogen production.

In one embodiment, a fuel processor reformer includes an extended set of reformer chambers in which the fuel enters a first chamber at one end and any unprocessed fuel exits with hydrogen (as reformate) at the other end into one or more additional chambers. The chambers may arranged to increase L but minimize overall size of the fuel processor.

This section describes fuel processors that improve hydrogen production by using one or more reformer chambers in a 'multipass' arrangement. A multipass reformer of the present invention reduces overall size of a fuel processor and fuel cell system, and is thus well suited for portable fuel cell systems and applications.

Figure 3A:
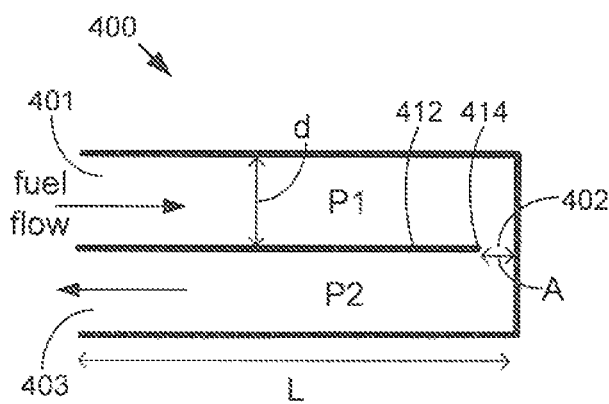
FIG. 3A illustrates a simplified top cross-sectional view of a multipass reformer in accordance with one embodiment of the present invention.
Figure 3B:
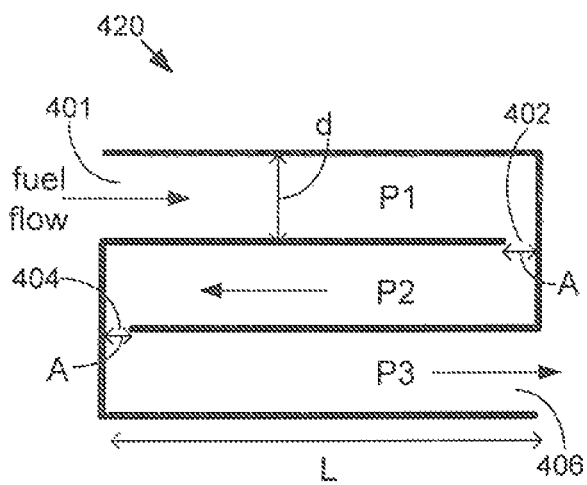
FIG. 3B illustrates a simplified top cross-sectional view of a multipass reformer in accordance with another embodiment.
Figure 3C:
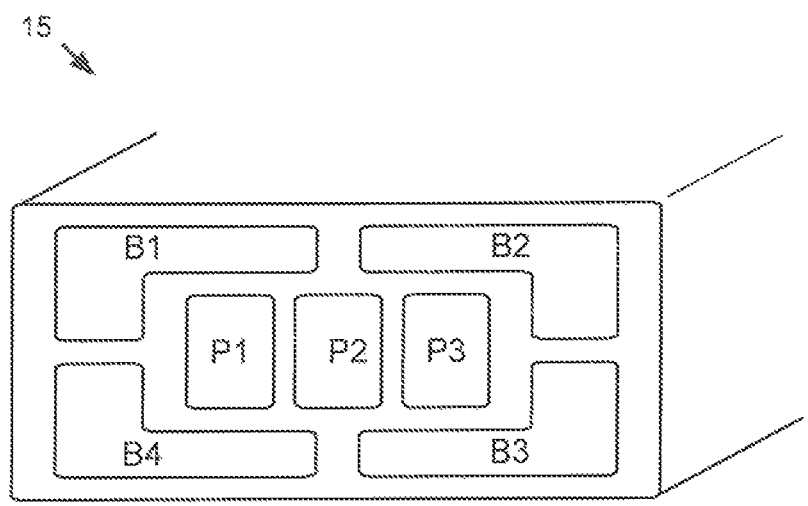
FIG. 3C illustrates a simplified cross-section of a fuel processor including the multipass reformer of FIG. 3B and multiple burner chambers in cross-section.

FIG. 3A illustrates a simplified top cross-sectional view of a multipass reformer 400 in accordance with one embodiment, of the present invention. FIG. 3B illustrates a simplified top cross-sectional view of a multipass reformer 420 in accordance with another embodiment. FIG. 3C illustrates a simplified cross-section of a fuel processor including the multipass reformer of FIG. 3B and multiple burner (B1-B4) chambers in cross-section.

A multipass reformer of the present invention includes multiple 'passes'. Each pass refers to a reformer chamber that includes a catalyst for producing hydrogen from a fuel. The terms 'chamber' and 'pass' are used interchangeably herein in a multipass reformer. A multipass reformer may include any plural number of passes. From 2 passes to 8 passes are suitable for many reformer configurations. More passes may be employed.

As shown in FIG. 3A, multipass reformer 400 includes two chambers (or passes): P1 and P2.

A first chamber, P1, receives a fuel such as methanol and includes a catalyst that processes the fuel to produce hydrogen along the length, L, for chamber P1. For example, L may correspond to the length of monolithic structure 100 of FIG. 2A. The catalyst is not shown in FIGS. 3A-3C to simplify illustration (see FIG. 2B for the catalyst for example). Chamber P1 includes an inlet 401 that receives the fuel and an outlet 402 that outputs hydrogen produced, in chamber P1 along with any unprocessed fuel remaining in the first reformer chamber P1 at outlet 402. Inlet 401 may correspond to the outlet of boiler 34, for example.

A second chamber, P2, receives the hydrogen and unprocessed fuel from outlet 402 and includes a catalyst that processes (at least some, but not necessarily all of) the remaining methanol to produce hydrogen. Hydrogen production may occur for less than the entire length, L, of chamber P2, depending on how gaseous communication is achieved between the first pass and second pass. In this case, an opening between chamber P1 and chamber P2 includes an aperture size, A. Chamber P2 thus includes: i) an inlet 402 that receives at least a portion of the fuel from chamber P1, ii) a catalyst capable of processing the portion of initial methanol to produce hydrogen, and iii) an outlet 403 that outputs the hydrogen from chamber P2.

Fluidically, methanol enters the reformer at inlet 401, travels along length L in a first direction for chamber P1, passes through inlet/outlet 404 into chamber P2, travels in opposite direction for the chamber P2 before exiting outlet 403. In this case, reformer 400 is configured such that methanol flows through chamber P1 from inlet 401 to outlet 402 in a first direction that is about parallel to a second direction that the methanol flows through chamber P2 from inlet 402 to outlet 403. In this case, the direction of fuel flow is about parallel but in the opposite direction for chambers P1 and P2.

As shown in FIG. 3B, multipass reformer 420 includes three chambers: chamber P1, chamber P2 and chamber P3. Chamber P1 is identical to that of multipass reformer 400 and includes inlet 401 for the reformer, a catalyst (not shown in FIG. 3B) and an outlet 402 to chamber P2. Chamber P2 includes inlet 402 from chamber P1, a catalyst and an outlet 404 to chamber P3. Chamber P3 includes inlet 404, a catalyst and an outlet 406 for the reformer. Chamber P3 receives methanol from outlet 404, and a catalyst in chamber P3 processes remaining methanol in the reformate to produce hydrogen. Thus, methanol not processed in chamber P1 may be processed in chamber P2, or in chamber P3 if the methanol from chamber P1 was not already processed in chamber P2. Inlet 401 may correspond to the inlet 401 as shown in FIG. 2A while outlet 406 may correspond to the reformer outlet port 191 as shown in FIG. 2A.

For multi-pass reformer 420, methanol enters the reformer at inlet 401, travels along length L in a first direction for chamber P1, passes through inlet/outlet 404 into chamber P2, travels in opposite direction for the chamber P2 through inlet/outlet 404 into chamber P3, travels along length L in about the first direction for chamber P3, before exiting outlet 406.

In the embodiments shown, communication between different chambers in the multipass reformer is accomplished using truncated walls between the chambers that do not fully extend along the entire length, L, of the multipass reformer. In another embodiment, end plates (see 182 and 184 of FIG. 2A) of the fuel processor include channels that communicate reactant and product gases between each pass of the reformer. Other apertures between reformer chambers may be used.

For the truncated inner walls shown in the reformers of FIGS. 3A and 3B, the amount of opening between adjacent chambers may be controlled to improve hydrogen production in the reformer. As shown, an opening between chambers P1 and P2 comprises an aperture 402 in the wall separating the two chambers. In one embodiment, the aperture, A, is sized according to a cross-sectional dimension of each chamber. In a specific embodiment, each aperture A is about ¼ the diameter or width (or height), d, of each pass. Decreasing the aperture sizes and/or placing them at the end of each chamber forces the methanol to travel the entire length of each chamber before traveling into the next chamber. In another embodiment, each aperture is about 1/10 to about ½ the diameter or width, d. Larger and other aperture sizes may be used.

In another embodiment, walls and/or corners internal to the reformer 15 are chamfered to improve gaseous flow. For example, inner wall 412 of reformer 400 includes rounded and chamfered edges 414. Chamfering the corners reduces edges that induce turbulence in the passing gases and other local vortices or flow disturbances that detract from catalyst interaction and fuel processor efficiency. The degree of chamfering may be varied, as one of skill in the art will appreciate.

In one embodiment, a major (or largest) dimension spatially or geometrically characterizes each chamber in the reformer, and the major dimension for each chamber is about parallel to the major dimension for each other chamber in the multipass reformer. For reformers 400 and 420, L characterizes a major dimension for each chamber P1-P3. In this case, the major dimensions for chambers P1, P2 and P3 are substantially parallel.

A multiple pass reformer of the present invention reduces the overall length, L, of a reformer without shortening the travel distance for fuel in the reformer. This provides a smaller fuel processor and fuel cell system, but does not compromise the amount of hydrogen that may be produced.

In one embodiment, the fuel processor is monolithic in cross-section and includes a common material that constitutes the structure. The common material may comprise a metal, such as copper, silicon, stainless steel, inconel and other metal/alloys displaying favorable thermal conducting properties. Using a metal for the fuel processor material that defines walls for the reformer passes and burners allows conductive heat transfer from the burner walls to each of the chambers in a multiple pass reformer. This advantageously keeps all chambers in the multipass reformer at elevated temperatures to facilitate catalytic production of hydrogen in each pass. Further description of fuel processors of the present invention are described in commonly owned pending patent application Ser. No. 10/877,044 and entitled "ANNULAR FUEL PROCESSOR AND METHODS", which was incorporated by reference above. In one embodiment, the fuel processor comprises an annular design in which the burners, B1-B4 (see FIG. 3C), substantially surround the reformer chambers P1-P3 in cross-section.

Other multi-pass arrangements are permissible. For example, in another embodiment, fuel enters chamber P2 first, then travels through apertures from chamber P2 to chamber P1 and chamber P3.

Planar Fuel Processor

In one embodiment, a fuel processor includes a low profile that reduces height for a fuel processor and fuel cell system package that includes the fuel processor. These low profile fuel processors are well suited for portable use where size and dimensions of a fuel processor and package are to be reduced. The low profile fuel processors include a single layer of collinear chambers for catalytic conversion of methanol to reformate and neighboring chambers for catalytic oxidation of methanol to provide heat. Limiting the number of chamber layers to a single layer reduces the height of a fuel processor.

FIGS. 4-7 illustrate various low profile fuel processors 200, 220, 240 and 260 having collinear reformer and burner chambers in accordance with several embodiments of the present invention. The collinear relationship of the reformer and burner chambers conveys that a straight line may be drawn through the cross sections shown and intercept at least a portion of each reformer and burner chamber. A wide variety of single layer designs are permissible with the present invention. The series of fuel processors detailed in FIGS. 4-7 illustrate several suitable configurations. Other variations are possible.

Fuel processors 200, 220, 240 and 260 all include multi-pass paths for a reformer and a burner included in a monolithic structure. As described above with respect to multipass reformer 400, the chambers for a multipass design may be substantially parallel and include flow in about parallel directions.

One common feature of fuel processors 200, 220, 240 and 260 is that a flow path for the reformer and a flow path for the burner is a single path through multiple chambers that extend the length of each monolithic structure. A single flow path for each of the reformer and burner extends the cumulative length of their respective chambers, which more readily provides a required volume to maintain a desired amount of catalyst for a fuel processor. More specifically, the single flow path through multiple parallel chambers creates a larger length (length of chamber—L) to diameter (hydraulic diameter of the chamber—D) ratio for the reformer and burner. As mentioned above, reformer and/or burner performance is often improved with larger L/D ratios.

Figure 4A:
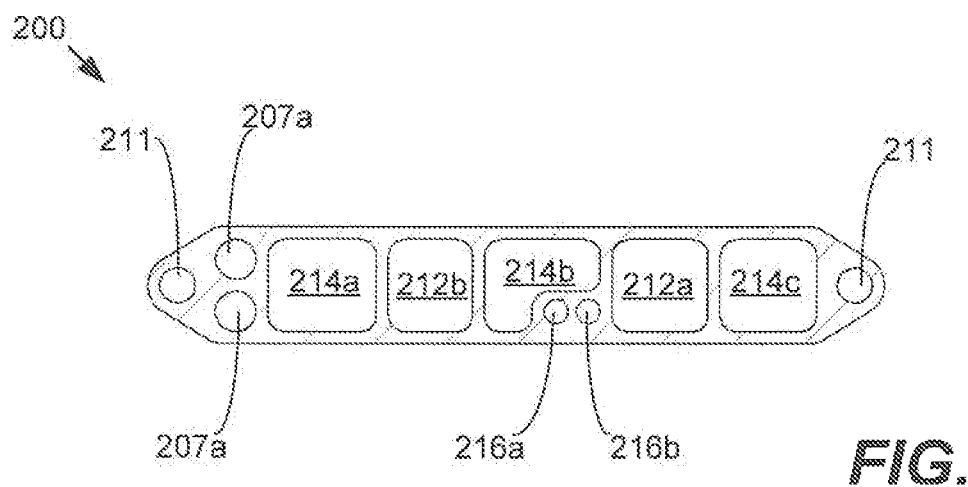
FIGS. 4A, 4B, 5A, 5B, 6A, 6B, 7A, and 7B illustrate various low profile fuel processors in accordance with several embodiments of the present invention.
Figure 4B:
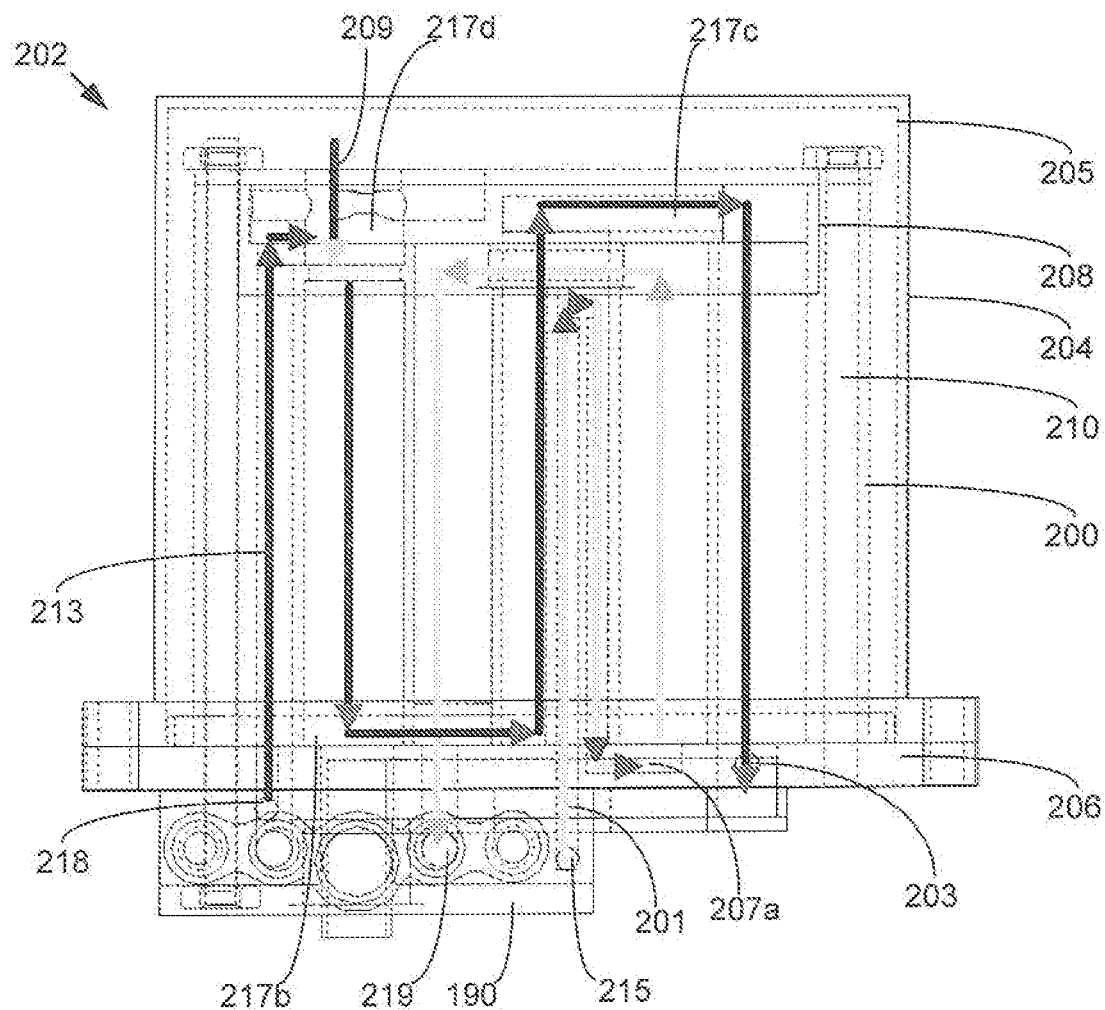

In each design, the orientation and direction of the flow paths are varied to alter heat transfer between neighboring chambers. FIG. 4A shows a front cross sectional view of a monolithic structure 200 in accordance with a specific embodiment of the present invention. FIG. 4B shows a top view of a monolithic structure 200 included in a fuel processor 202 in accordance with a specific embodiment of the present invention.

Fuel processor 202 includes monolithic structure 200, interconnect 190, housing 204, dewar 205, end plates 206 and 208, and bolts 210. Housing 204 and dewar 205 were described above. End plates 206 and 208 attach to opposite end of monolithic structure 200 using bolts 210, and include plumbing lines that permit the passage of fluids between chambers of monolithic structure 200 (e.g., between multiple reformer chambers or from a boiler chamber to a reformer chamber). Bolts 210 pass through holes 211 in monolithic structure 200 and holes in end plates 206 and 208 and interconnect 190 to secure the multiple parts of fuel processor 202.

Monolithic structure 200 includes a single layer design (FIG. 4A) that includes reformer 212 and burner 214. Reformer 212 comprises a multiple chamber and single reformer-path design, while burner 214 comprises a multiple chamber and single burner-path design.

More specifically, reformer 212 includes two reformer chambers 212a and 212b that are about parallel to each other and extend the length of monolithic structure 200. Reformer fuel flow is shown in FIG. 4B using arrows 201. Referring to FIGS. 4A and 4B, reformer methanol 1) enters a reformer inlet 215, 2) passes the length of monolithic structure 200 through a first reformer boiler chamber 216a, 3) passes back along the length of monolithic structure 200 through a second reformer boiler chamber 216b, 4) travels through a channel 217a in end plate 206 to a first reformer chamber 212a, 5) passes the length of monolithic structure 200 through the first reformer chamber 212a where it is catalytically processed to produce hydrogen, 6) flows through an outlet in chamber 212a and into end plate 208 that transfers the fuel to an inlet of a second reformer chamber 212b, 7) passes the length of monolithic structure 200 through the second reformer chamber 212b to produce more hydrogen, and 8) exits via an outlet of the second, reformer chamber 212b (as hydrogen and any unprocessed, fuel) to a reformate outlet in interconnect 190.

Burner 214 includes three burner chambers 214a, 214b and 214c that are about parallel to each other and extend the length of monolithic structure 200. Burner fuel flow is shown in FIG. 4B using arrows 213. Referring to FIGS. 4A and 4B, burner methanol 1) enters a boiler inlet 218, 2) passes the length of monolithic structure 200 through dual and adjacent burner boiler chambers 207a and 207b, 3) the methanol is now vaporized and mixes with oxygen 209 in a channel 217d in end plate 208, 4) passes back along the length of monolithic structure 200 with the oxygen through a first burner chamber 214a where it is catalytically combusted to generate heat, 5) travels through a channel 217b in end plate 206 that passes the remaining methanol and oxygen to a second reformer chamber 214b, 6) passes secondly up the length of monolithic structure 200 through the second burner chamber 214b to generate heat in chamber 214b, 7) travels through a channel 217c in end plate 208 that transfers the fuel to an inlet of a third burner chamber 214c, 8) passes secondly down the length of monolithic structure 200 through the third burner chamber 214c to generate heat in chamber 214c, and 9) exits via an outlet of the third, burner chamber 214c to a burner exhaust 203.

In summary, fuel processor 202 has a 3-pass burner flow path and a 2-pass reformer flow path (all in a single linear plane for the monolithic structure 200). The advantage of this design is that each reformer chamber 212 neighbors two adjacent burner chambers 214. This provides multi-directional heat transfer for the endothermic reaction occurring in each reformer chamber 212. This design is also useful because there are only three main parts for the core fuel processor 202; monolithic structure 200 and end plates 206 and 208, which eases assembly of fuel processor 202.

Figure 5A:
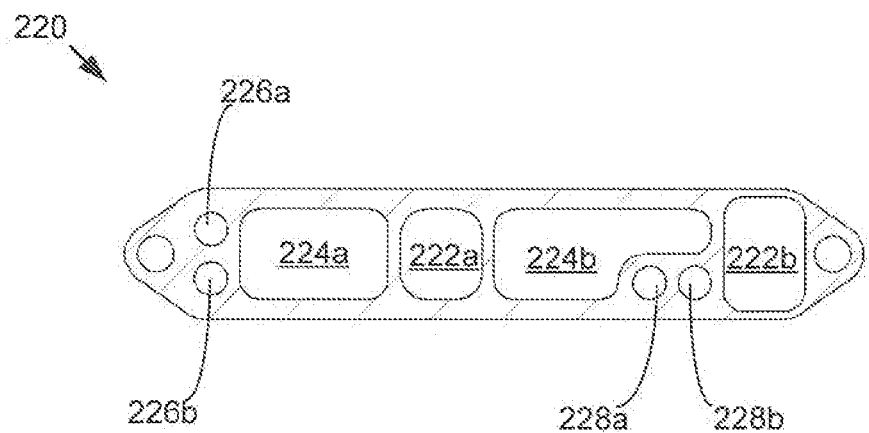
Figure 5B:
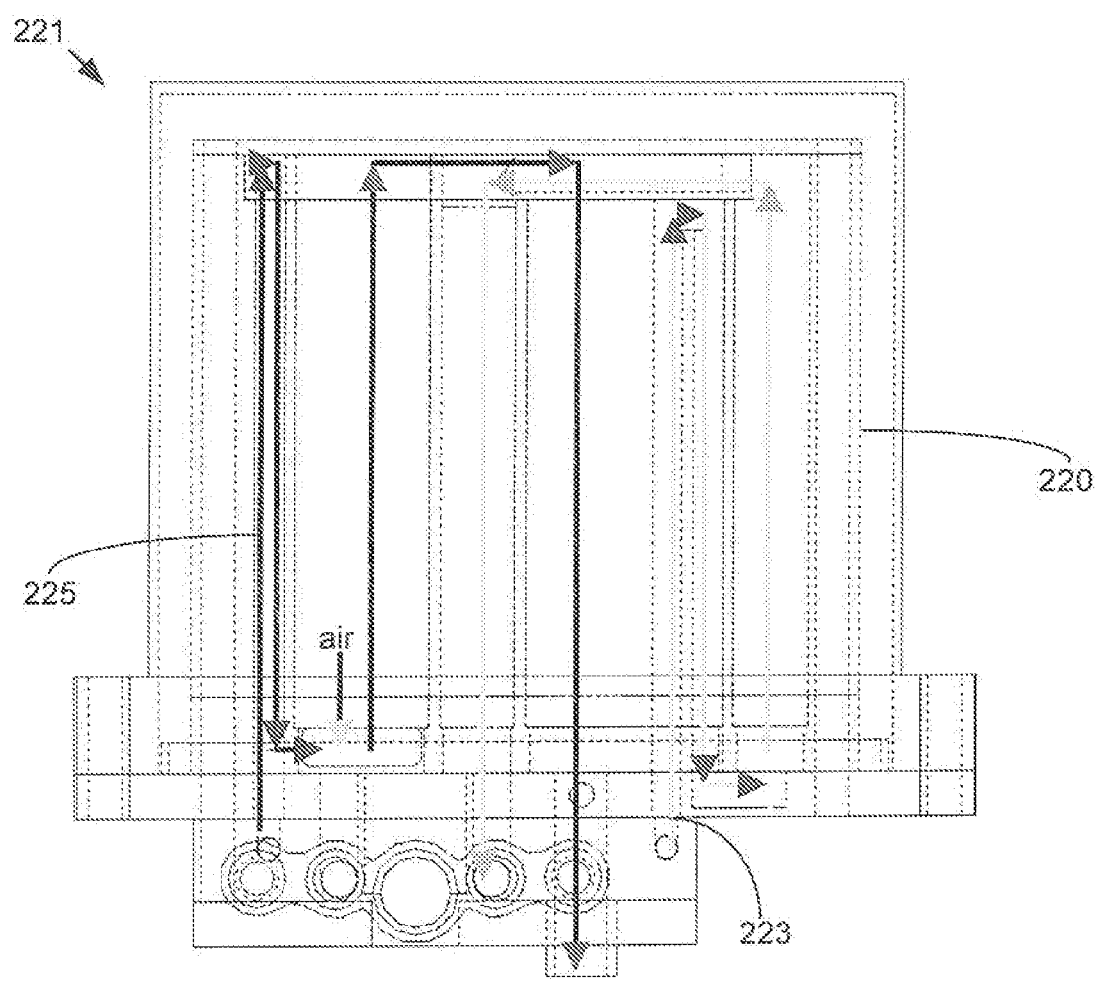

FIG. 5A shows a front cross sectional view of a monolithic structure 220 in accordance with another specific embodiment of the present invention. FIG. 5B shows a top view of a monolithic structure 220 included in a fuel processor 221 in accordance with another specific embodiment of the present invention.

Fuel processor 221 includes a 2-pass burner 224 and a 2-pass reformer 222. Burner methanol flows through dual burner boilers 226a and 226b and burner chamber 224a and 224b as shown by arrows 223 in FIG. 5B. Reformer methanol flows through two pass reformer boilers 228a and 228b and reformer chambers 222a and 222b as shown by arrows 225. Reformer chamber 222a is flanked on both lateral sides by burner chambers 224a and 224b; however, reformer chamber 222b has only one side adjacent to burner chamber 224b.

Figure 6A:
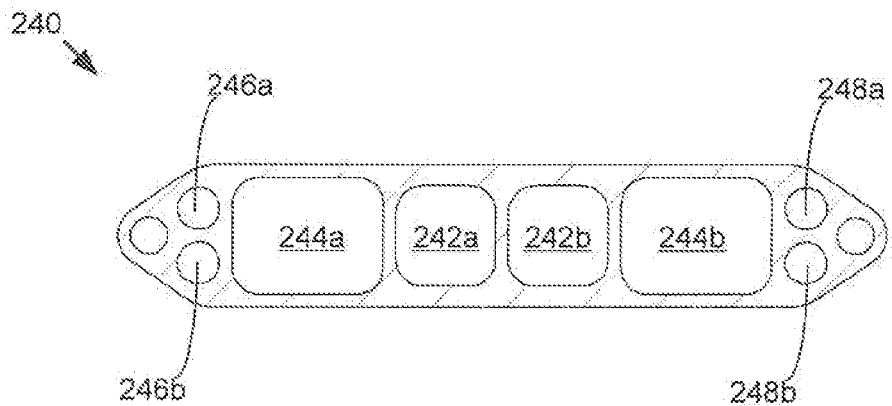
Figure 6B:
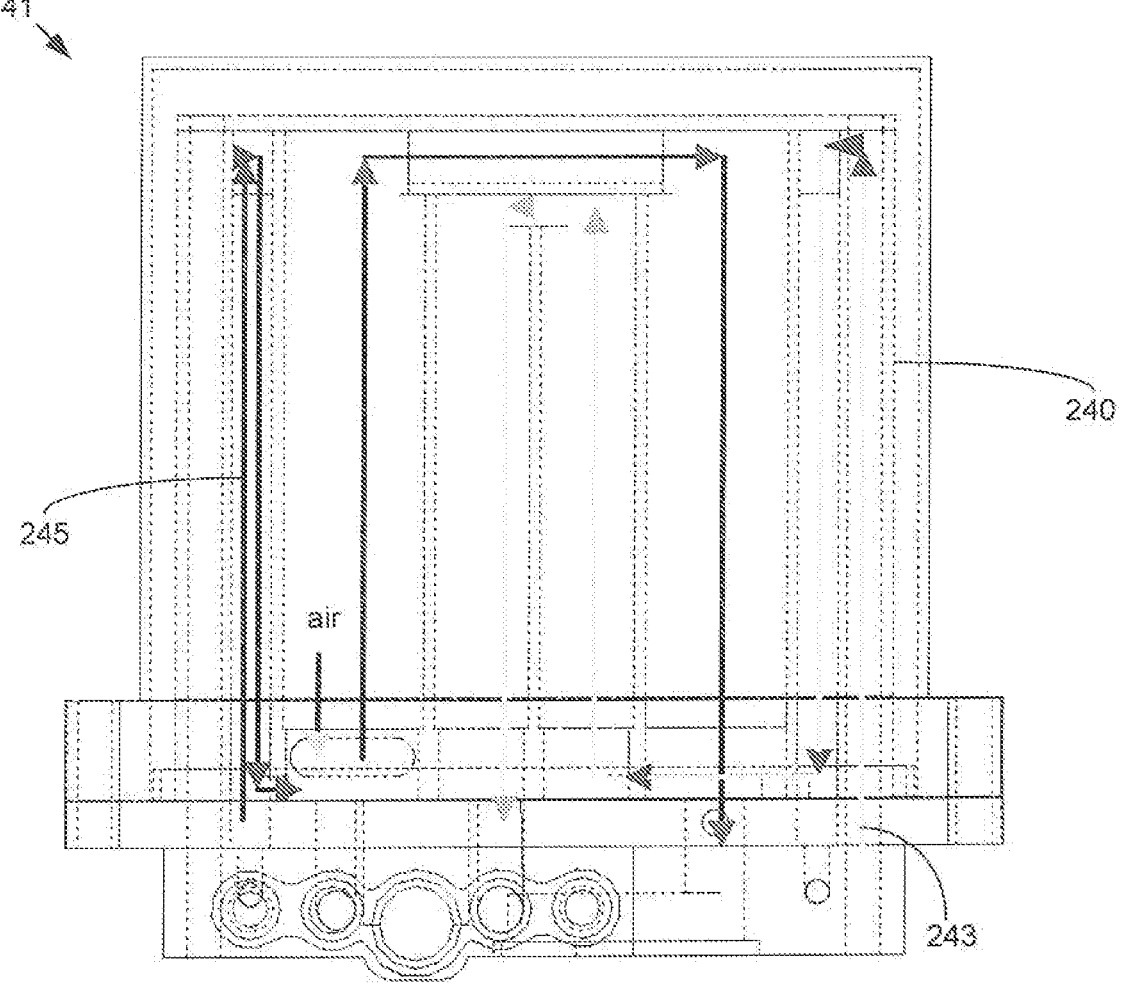

FIG. 6A shows a front cross sectional view of a monolithic structure 240 in accordance with another specific embodiment of the present invention. FIG. 6B shows a top view of a monolithic structure 240 included in a fuel processor 241 in accordance with another specific embodiment of the present invention.

Fuel processor 241 includes a 2-pass burner 224 and a 2-pass reformer 222. In this case, the reformer chamber flow path 243 follows the inside of the burner chamber path 245. More specifically, burner methanol flows through dual burner boilers 246a and 246b and burner chamber 244a and 244b as shown by arrows 243 in FIG. 6B. Reformer methanol flows through two pass reformer boilers 248a and 248b and then internally to reformer chambers 242a and 242b as shown by arrows 245. This design is symmetrical and simple, which eases in manufacture.

Figure 7A:
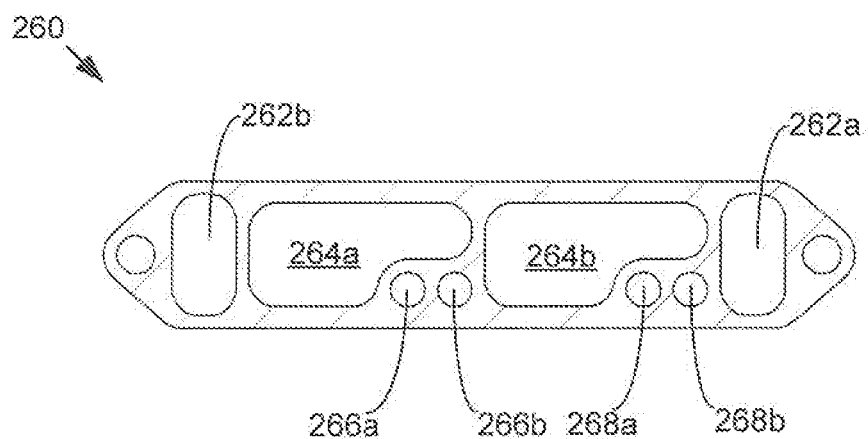
Figure 7B:
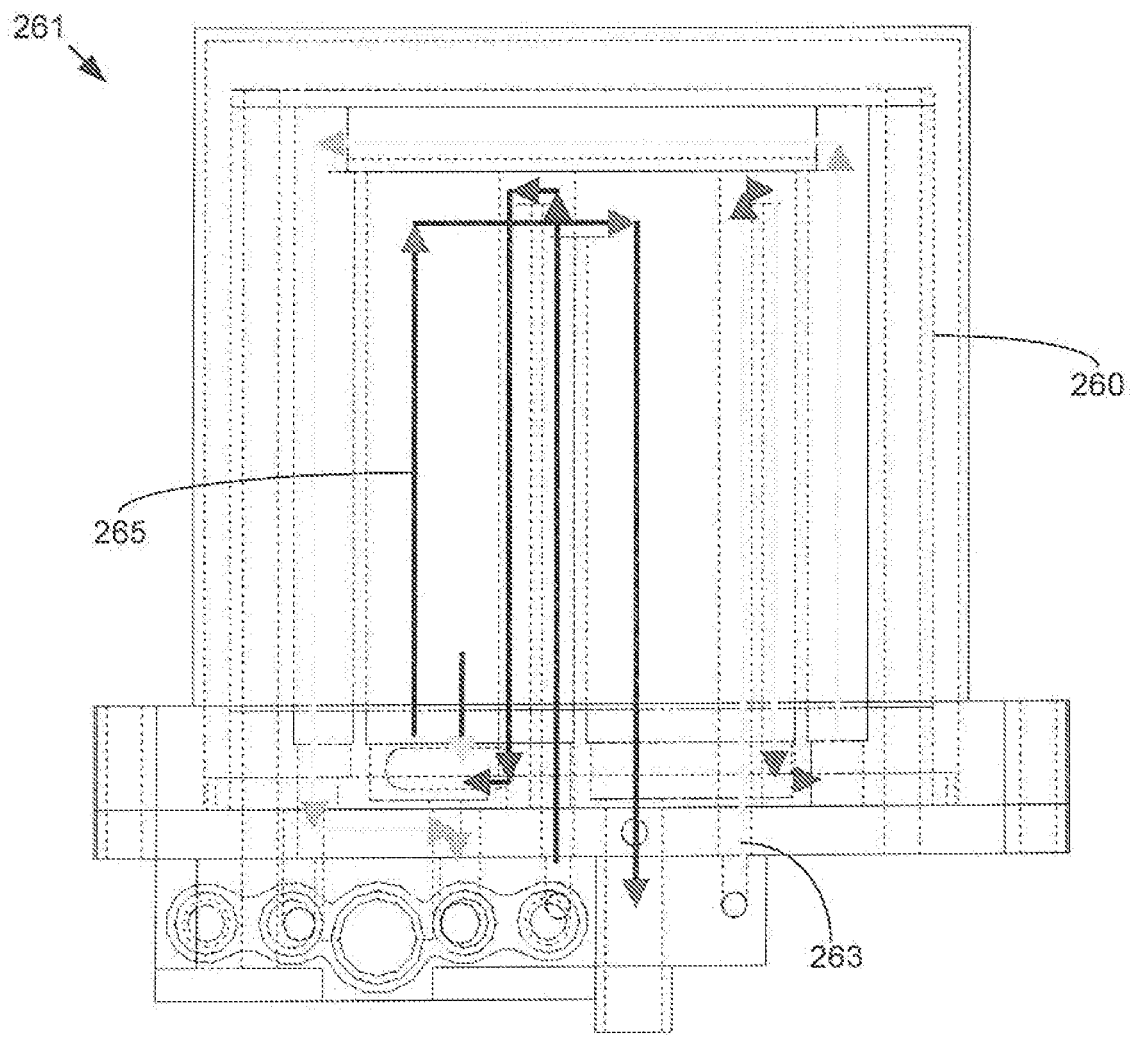

FIG. 7A shows a front cross sectional view of a monolithic structure 260 in accordance with another specific embodiment of the present invention. FIG. 7B shows a top view of a monolithic structure 260 included in a fuel processor 261 in accordance with another specific embodiment of the present invention.

Fuel processor 261 includes a 2-pass burner 264 and a 2-pass reformer 262. In this case, the burner chamber path 265 follows the inside of the reformer chamber flow path 263. More specifically, burner methanol flows through two pass burner boilers 266a and 266b and burner chamber 264a and 264b as shown by arrows 263 in FIG. 7B. Reformer methanol flows through two pass reformer boilers 268a and 268b and then externally to reformer chambers 262a and 262b as shown by arrows 265. Locating the reformer chamber flow path 263 on the outside of the burner chamber flow 265 path helps more heat go to the reformer 262 than to the surrounding outside fuel processor 261.

Multipass fuel processors so far have included chambers with relatively consistent dimensions along their length. In another embodiment, one or more chambers include a cross section that varies with length normal to a cross section.

Figure 8:
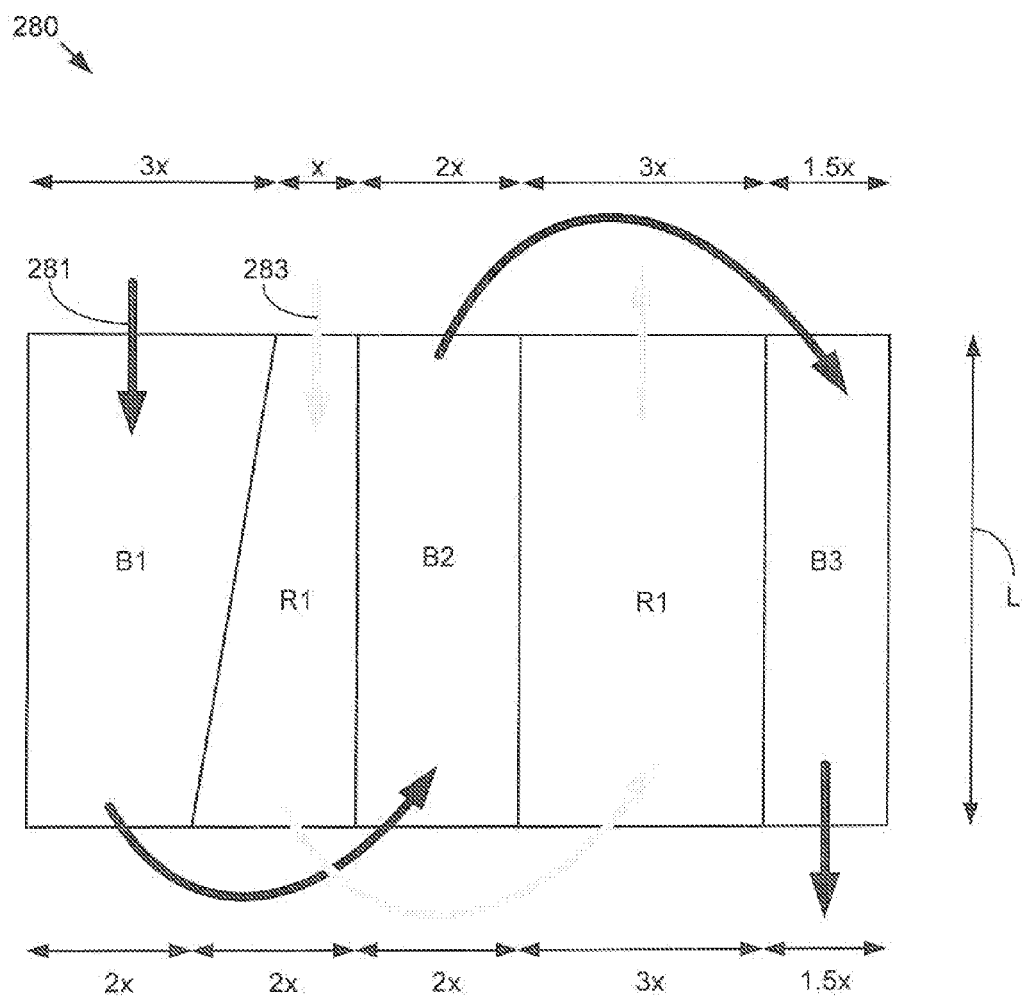
FIG. 8 illustrates simplified dimensions for a multipass fuel processor in accordance with another specific embodiment of the invention.

FIG. 8 illustrates simplified dimensions for a multipass fuel processor 280 in accordance with another specific embodiment of the invention. Multipass fuel processor 280 includes reformer chambers R1 and R2 and burner chambers B1, B2 and B3 disposed in a single layer design that has chambers of varying cross sectional dimensions along a length, L.

In this instance, a width of burner chamber B1 and reformer chamber R1 varies along length L. The cross sectional width is scalable for fuel processor 280 and normalized for each chamber using 'x'. Burner chamber B1 has a bigger width at a top entrance region (3x) compared to its exit (1.5x), while reformer chamber R1 has a smaller entrance region (1x) and bigger width at the exit (2x). The expanding cross sectional area of reformer chamber R1 allows the pressure drop across the reformer chamber R1 to reduce along length L.

In addition, a larger volume at a burner entrance increases heat production in the entrance region where most methanol reforming occurs in the adjacent reformer chamber R1. This is coupled with a lower reformer cross section, where more reformer methanol gathers and has less surface area to expedite heat transfer from the reformer chamber walls to the gaseous reformed reactants. The larger entrance cross-section for burner chamber B1 and smaller entrance for reformer chamber R1 thus transfers heat faster from the heater to the reformer reactants. Commonly, most methanol is combusted near the burner entrance, resulting in less heat available at an exit of a reformer chamber. With lower temperatures at a reformer exit, pressure drop across the reformer chamber can be significantly reduced due to the reduction in gas volume. As a result, higher methanol conversion is achieved when the heat is highest and available.

Arrows 281 show the flow of burner reactants and products, while arrows 283 show the flow of reformer reactants and products. The directions of reformer flow and burner flow in this design are co-current. This is in contrast to designs above where the reformer flows and burner flows are counter current. By running burner flow/reformer flow co-current, more heat transfers at the entrance region of each reformer chamber and less heat transfers at the exit of each reformer, also resulting in minimal volume expansion at a reformer exit.

Annular Burner Fuel Processors

So far, fuel processors have included one or more reformer chambers annularly internal one or more burner chambers in cross section. The present invention may also include the opposite: one or more burner chambers annularly internal to one or more reformer chambers in cross section.

Figure 9:
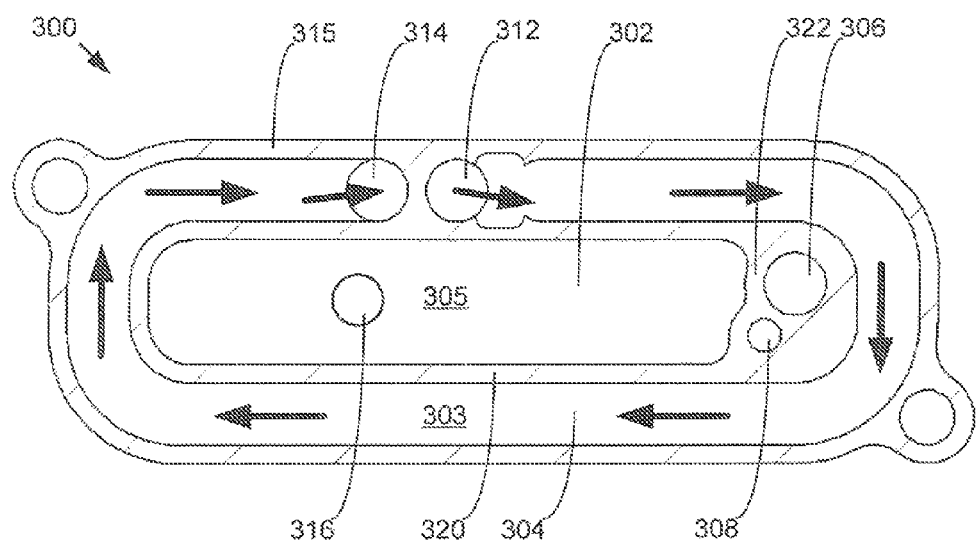
FIG. 9 illustrates a cross sectional view of a monolithic structure included in a fuel processor in accordance with one embodiment of the present invention.

FIG. 9 illustrates a cross sectional view of a monolithic structure 300 included in a fuel processor in accordance with one embodiment of the present invention. Monolithic structure 300 includes reformer 302, burner 304, boiler 306 and boiler 308.

Burner 304 includes a voluminous burner chamber 305 having a height, width and depth. This three dimensional configuration for burner chamber 305 contrasts micro fuel processor designs where the burner chamber is etched as micro channels onto a planar substrate. The non-planar dimensions of burner chamber 305 permit greater volumes for burner 304 and permit more catalyst for a given size of a fuel processor. This increases the amount of methanol that can be burned and enhances heat production for a particular fuel processor 15 size. Burner 304 thus improves fuel processor's 15 suitability and performance in portable applications where fuel processor size is important or limited. In one embodiment, burner chamber 305 comprises a volume greater than about 0.1 cubic centimeters and less than about 50 cubic centimeters. In some embodiments, burner 304 volumes between about 0.5 cubic centimeters and about 4.5 cubic centimeters are suitable for laptop computer applications.

For communication of burner reactants and products to and from the burner chamber 305, the burner chamber 305 directly or indirectly opens to a fuel inlet (e.g., from boiler 308 in one of end walls 182 or 184 of FIG. 2A), opens to an air inlet, and opens to a burner exhaust 316.

Monolithic structure 300 includes a reformer 302 having at least one reformer chamber 303. As shown, reformer 302 includes a single reformer chamber 303, which is a voluminous space that includes a reforming catalyst (such as catalyst 102 as described above), opens to a fuel inlet 312 (from boiler 306), and opens to hydrogen outlet 314. A multipass reformer as described herein may also be used in the configuration shown. Walls 315 of monolithic structure 300 define an annular cross-sectional shape for reformer 302 and its reformer chamber 303 that at least partially surround burner 304 in cross section. Walls on end plates 182 and 184 (see FIG. 2A) close reformer chamber 303 on either end of the chamber and include the inlet and outlet ports 312 and 314 to chamber 303.

Reformer chamber 303 includes a non-planar volume. As the term is used herein, a non-planar reformer chamber 303 refers to a shape in cross section that is substantially non-flat or non-linear. A cross section refers to a planar slice that cuts through the fuel processor or component. For cross sections that include multiple fuel processor components (e.g., both burner 304 and reformer 302), the cross section includes both components. For the vertical and front cross section shown in FIG. 9, the cross sectional dimensions shown are consistent for monolithic structure 300 from end plate 182 to end plate 184 of FIG. 2A.

Reformer 302 is configured relative to burner 304 such that heat generated in a burner 304 transfers to reformer 302. As shown, reformer 302 is annularly disposed about burner 304. As the term is used herein, annular configuration of a reformer relative to a burner refers to a reformer having, made up of, or formed by, continuous or non-continuous segments or reformer chambers 305 that surround burner 304. The annular relationship is apparent in cross section. For burner and reformer arrangements, surrounding refers to a reformer 302 bordering or neighboring the perimeter of burner 304 such that heat may travel from a burner 304 outward to the reformer 302. In this case, a heating gradient is formed such that heat primarily travels outwards to the reformer, with the exception of any heat captured by boilers 306 and 308.

Reformer 302 may surround burner 304 about the perimeter of burner 304 to varying degrees based on design. At the least, reformer 302 surrounds greater than 50 percent of the burner 304 cross-sectional perimeter. This differentiates monolithic structure 300 from planar and plate designs where the burner and reformer are co-planar and of similar dimensions, and by geometric logic, the burner neighbors less than 50 percent of the reformer perimeter. In one embodiment, reformer 302 surrounds greater than 75 percent of a burner 304 cross-sectional perimeter. Increasing the extent to which reformer 302 surrounds burner 304 perimeter in cross section increases the surface area of burner 304 that can be used to heat the reformer volume via heat generated in the burner. For some fuel processor designs, reformer 302 may surround greater than 90 percent of a burner cross-sectional perimeter. For the embodiment shown in FIG. 9, reformer 302 surrounds almost the entire burner 304 cross-sectional perimeter, except for space between ports 312 and 314.

In one embodiment, reformer 302 and its reformer chamber 303 has a non-planar cross-sectional shape. A non-planar reformer 302 may employ cross-sectional shapes such as quadrilaterals, non-quadrilateral geometries with more or less sides, an elliptical shape, or more complex cross-sectional shapes.

Reformer 302 borders burner 304 on multiple sides. N-lateral bordering in this sense refers to the number of sides, N, of burner 304 that a reformer (and its reformer chamber 303) borders in cross section. In this case, reformer 302 borders left, right, top and bottom sides of burner 304. Thus, reformer 302 quadrilaterally borders burner 304 on all four substantially orthogonal burner 304 sides. Reformer 302 also includes a single and contiguous chamber 303 about the perimeter of burner 304 that quadrilaterally borders reformer 302. A 'U-shaped' reformer 302 may be employed to trilaterally border burner 304 on three sides. Alternatively, multiple multipass reformer chambers may be used to border multiple sides of burner 304.

Heat generated in burner 304 transfers directly and/or indirectly to reformer 302. For the monolithic structure 300 of FIG. 9, burner 304 and reformer 302 share common wall 320 and heat generated in burner 304 transfers directly to reformer 302 via conductive heat transfer through the wall 320. Wall 320 forms a boundary wall for burner 304 and a boundary wall for reformer 302. As shown, one side of wall 320 opens to burner chamber 305 while another portion of the wall opens to reformer chamber 303. Wall 320 thus permits direct conductive heat transfer between burner 304 and reformer 302. Wall 320 also extends around, all four sides of burner 304 (but need not extend around all four sides to be effective for conductive heat transfer), and thus provides direct conductive heat transfer in multiple orthogonal directions from burner 304 to reformer 302.

Boiler 306 comprises cylindrical walls in monolithic structure 300 and end walls on end plates 182 and 184 (see FIG. 2A) that define a boiler chamber. Boiler 306 is disposed in proximity to burner 304 to receive heat generated in burner 304. For monolithic structure 300, boiler 306 shares a common wall 322 with burner 304. Common wall 322 permits direct conductive heat transfer from burner 304 to boiler 306. Boiler 306 is also disposed between burner 304 and reformer 302 to intercept thermal conduction consistently moving from the high temperature and heat-generating burner 304 to the endothermic reformer 302. As mentioned above, boiler 306 heats methanol (and preferably vaporizes the methanol) before provision of the methanol to reformer 302. An outlet of boiler 306 provides vaporized methanol to reformer 302. In another embodiment, boiler 306 includes multiple cylinders in cross section that wrap around burner 304 (from a top view) to increase the length of boiler 306 and provide more time for heat to vaporize incoming methanol.

Boiler 308 is configured to receive heat from burner 304 to heat methanol before burner 304 receives the methanol. Boiler 308 also comprises a tubular shape having a circular cross section that extends through monolithic structure 300 from end plate 182 to end plate 184. In the embodiment shown, boiler 308 extends parallel to burner 304 along the length of monolithic structure 300. Boiler 308 is disposed in proximity to burner 304 to receive heat generated in the burner, which is used to heat the methanol. Boiler 308 also shares a common wall 322 with burner 304. Common wall 322 permits direct conductive heat transfer from burner 304 to boiler 308.

In this case, the fuel processor uses a single flow path for reactants in reformer chamber 303 and a single flow path for reactants in burner chamber 305. The burner includes a single direction of methanol flow from one end of monolithic structure 300 to the other and about perpendicular to the cross section shown. As shown, vaporized fuel enters reformer chamber 303 through inlet 312 (from boiler 306) and flows clockwise around burner 304 to reformer outlet 314. The endothermic reformer chamber 303 path thus flows annularly around the central and hot burner chamber 305, and the continuously cooler reactants and endothermic reaction draw the majority of heat generated in burner 304. Reformer 302 thus encompasses burner 304 so that less heat goes to the surroundings outside of the fuel processor.

Since reformer chamber 303 spirals around burner 305, the length of reformer chamber 303 is longer in order to maintain a certain volume of reformer catalyst. This creates a larger reformer length (length of reformer chamber—L) to diameter (hydraulic diameter of the chamber—D) ratio for reformer chamber 303. Reactor performance typically improves with larger reformer chamber L/D ratios. The burner chamber 305 is also a single pass, but the cross sectional area is larger and the length of the chamber 305 is shorter. This reduces the pressure drop across a burner catalyst bed.

Improved Assembly of Fuel Processors

In another aspect, the present invention provides fuel processors that improve fuel processor assembly. Typically, a fuel processor includes a number of components that are assembled during manufacture. In one embodiment, fuel processors of the present invention include at least two components that are configured to provide a) precise location relative to each other during assembly using features on the two components and b) coupling to each other during assembly without the use of a permanent form of attachment. Assembly and fixture features included in the components thus facilitate alignment during assembly, and also provide holding forces that maintain relative position between the components during assembly. The positioning and holding forces are useful to ease assembly before any permanent attachment is made between the two components, such as gluing components or soldering metal components.

Location between two fuel processor components refers to positioning or alignment of components to be attached, or mated according to desired dimensions for a fuel processor or according to a desired relative position between the two components. Location may include 2-D or 3-D relative positioning between the components. 2-D relative positioning may include x-y planar positioning and z-rotation positioning. 3-D relative positioning includes linear and rotational positioning in all of x, y, and z dimensions. Other coordinate systems may be used, such as rotational roll, pitch and yaw coordinate systems, and the present invention is not limited by coordinate space definition.

Holding between two fuel processor components refers to the provision of resistive forces that maintain a desired position between the two components during assembly. Holding may include any 2-D or 3-D forces. Any coordinate system may be used to characterize the forces.

Features included in fuel processor components are referred, to as 'fixturing features' when they provide both positioning and holding functions. In manufacturing, fixturing refers to the dual function of locating a part and holding the part using the same features. Exemplary fixturing features include mating pegs and holes, mating surfaces on two components, mating edges on two components, etc.

Figure 10A:
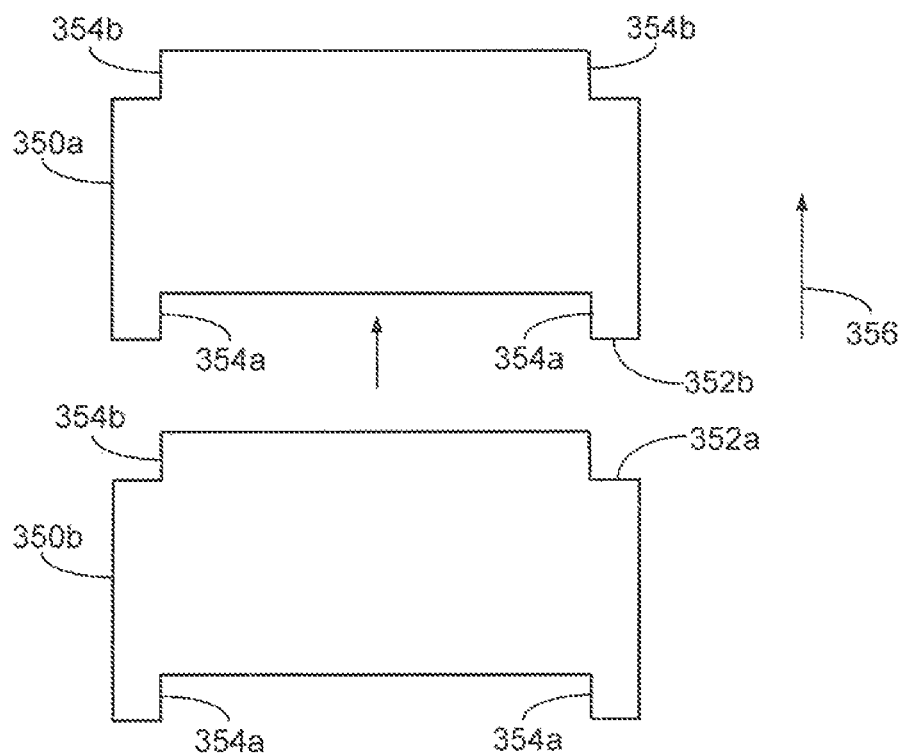
FIGS. 10A and 10B show a simplified side view and cross-section, respectively, of modular fuel processor components in accordance with one embodiment of the present invention.
Figure 10B:
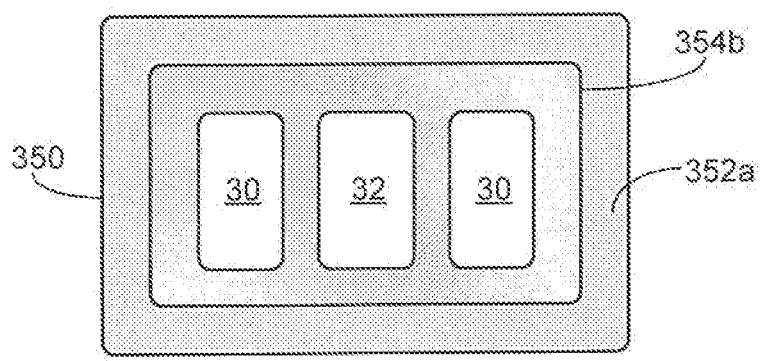

FIGS. 10A and 10B show a simplified side view and cross-section, respectively, of fuel processor components 350a and 350b in accordance with one embodiment of the present invention.

Components 350 include mating fixturing features 352 and 354 that permit a) precise location of components 350 relative to each other during assembly and b) connection of components 350 to each other during assembly without the use of a permanent form of attachment. More specifically, components 350 each include a fixturing shelf 352a, a fixturing landing 352b, an inner surface 354a, and an outer surface 354b.

Fixturing shelf 352a includes a perimetrically disposed and flat portion of the substrate (or material) for structure 350, which is disposed near the top of monolithic structure 350. Fixturing landing 352b includes a perimetrically disposed vertical extension of the substrate in monolithic structure 350, which is disposed near the bottom of monolithic structure 350. Shelf 352a and landing 352b are dimensioned to mate with each other and configured, such that assembly along vertical axis 356 mates the surface of shelf 352 with the surface of landing 352b. The surfaces of shelf 352a and landing 352b thus provide: positioning in vertical axis 356 and rotational positioning in x and y planes of the flat surfaces.

Inner surface 354a is dimensioned to mate with outer surface 354b. In this case, surfaces 354 include substantially rectangular surfaces that provide: a) positioning in x and y planes of the flat surfaces normal to the vertical axis 356, and b) rotational positioning in vertical axis 356. Extending surfaces 354a and 354b in the vertical axis 356 also provides: c) rotational location about the x and y-axis. Surfaces 354a and 354b may also be considered male and female counterparts since surface 354a inserts into surface 354b. The matching dimensions for surfaces 354a and 354b also provide holding forces by preventing: i) translational relative motion between components 350 in the x and y planes normal to the vertical axis 356, and ii) rotation about vertical axis 356. In one embodiment, shelf 352a and landing 352b are dimensioned, to impart a press fit when structures 350 are assembled together. The press fit provides frictional forces that additionally provide holding forces in vertical direction 356.

In this case, press fit dimensions for surfaces 354a and 354b couple with shelf 352 and landing 352b to locate and hold two components in all six degrees of freedom between the two parts when assembled together. The press fit will provide holding forces according to the relative dimensioning of surfaces 354a and 354b and the elastic modulus of the materials used in components 350. Preferably, the press fit is dimensioned to provide forces that overcome forces imposed on components 350 during handling and assembly.

During fuel processor manufacture, individual components may be assembled, together using the fixturing features until more permanent attachment or connectivity is formed. During the permanent securing operation, the fixture features provide resistive forces to securing operation.

Assembly of component 350 may then include permanent attachment. Metal components such as copper may be brazed together, glued or secured with a bolt, for example. In the absence of fixturing features 352 and 354, the attachment process often introduces forces that affect alignment. Misalignment of components during assembly may affect fuel processor performance; incorrectly aligned reformer sections may affect flow of reactants through the reformer, thus reducing reformer efficiency.

Other fixturing features are contemplated. For example, one component 350 may comprise a metal peg that inserts into a hole in a second component 350 (another male/female relationship). Precise positioning of the metal peg and hole during manufacture of each component ensures that assembly of the two components maintains a desired positional accuracy of the two components after assembly. A suitable press-fit size for the peg provides resistive forces that resist relative motion and opposition to forces encountered during assembly.

In another embodiment, the fixture features comprise elevated surface features on one component that spatially mate with recessed, surface features of the second component. In this case, one component includes an elevated surface feature that spatially matches a recessed surface feature on the second component. A tight fit between the elevated surface feature and the recessed surface feature may also provide multiple points of contact for positional accuracy and resistive holding forces. The elevated surface features may form a surface geometry such as a square, rectangle, circular, oval, or another simple or customized surface geometry. Corners of the rectangle or square may be rounded. Other geometries are contemplated.

Components 350a and 350b include monolithic structures as described above with respect to FIGS. 2A and 2B—with the addition of fixturing features 352 and 354 to improve assembly of a fuel processor. As shown, components 350 are modular in a direction orthogonal to the cross-sectional direction shown in FIG. 10B. Components 350a and 350b are modular in that any number of monolithic structures 350 can be assembled, in a vertical direction that corresponds to a vertical axis 356 for each component 350 (FIG. 10A).

In this case, cross-sectional dimensions of monolithic structures 350 and their respective reformer 32 and two burners 30 are substantially constant along the vertical axis 356 of the monolithic structure 350 (see also FIG. 2A). Component 350 is modular and configured such that any number of components may be assembled in series. More specifically, using this design, two modular components may be assembled by inserting male fixture features of one component into female fixture features of the other component. A third modular component may be similarly attached on the male or female end. Any number of components 350 may be assembled and stacked in series. Before permanent attachment is complete, the components may resemble detachable blocks that are temporarily assembled and may be detached. Monolithic structures 350 can be made in different lengths in the vertical axis 356 (e.g., 1 cm and 2 cm pieces) to permit flexible assembly of fuel processors with different lengths (such as any length along vertical axis 356 from 1 cm to 15 cm, for example) and permit flexible hydrogen processing capacities for a fuel processor—without requiring dedicated components and sizing for any particular fuel processor size or hydrogen processing capacity.

Another embodiment of this invention relates to a method for manufacturing a fuel processor. The method includes receiving or manufacturing one or more components for use in the fuel processor. Each component comprises at least one fixture feature that provides a) positioning for the component when assembled with a second component in the fuel processor, and b) resistive forces that maintain a desired position between the two components during assembly and any further attachment process. The method also includes assembling the first and second components using the fixture features. The method further includes permanently attaching or securing the two components.

Another fixturing embodiment provides a case or casing for use with a fuel processor. The casing forms at least a part of an outer housing for the fuel processor that eases assembly and manufacture of the fuel processor. One embodiment of an outer housing suitable for use with a fuel processor was housing 152 described above in with respect to FIG. 2B.

Figure 11:
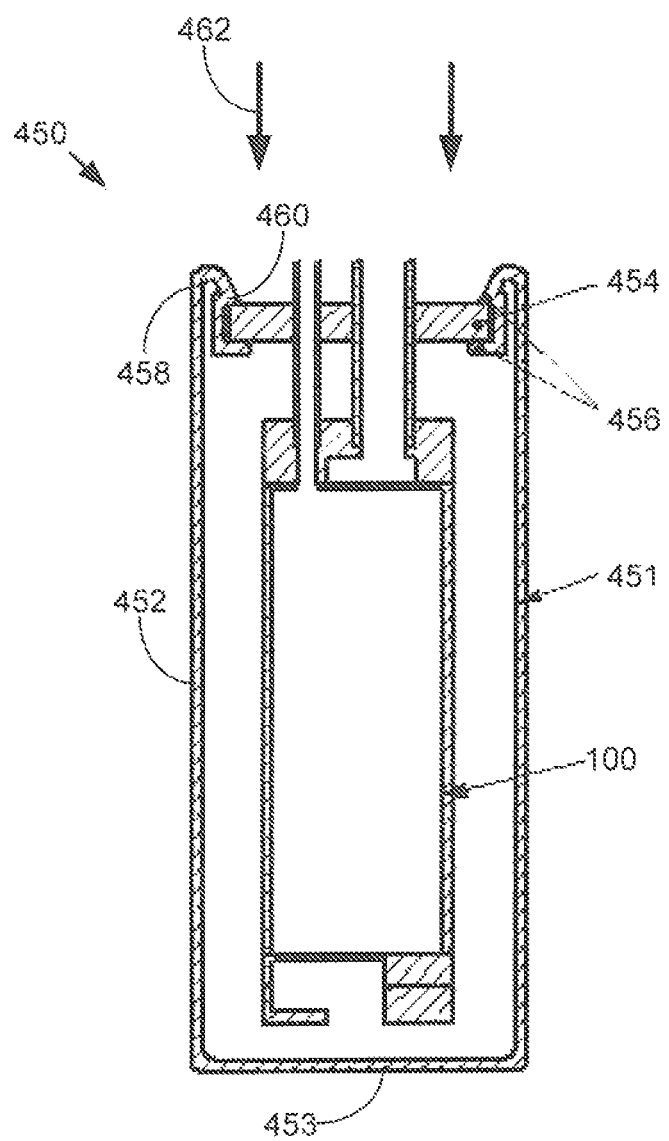
FIG. 11 shows a side cross-section view of a fuel processor in accordance with a specific embodiment of the present invention.

FIG. 11 shows a side cross-section view of a fuel processor 450 in accordance with a specific embodiment of the present invention. Fuel processor 450 includes a casing 452 that improves assembly and manufacture of the fuel processor.

A housing 451 for fuel processor 450 provides mechanical protection for components contained therein, and includes a casing 452 and a header 454. These two components detachably join to form housing 451 and contain components of fuel processor 15. Casing 452 includes a slot 456 that borders an opening near one end 458. Slot 452 and header 454 are configured such that header 454 snaps into slot 456 and stays there in the absence of forces that actively separate the two components. Thus, header 454 is dimensioned, to fit into slot 456. Slot 456 refers to a groove in casing 452 and related portions of casing 452 that receive header 454 and hold header 454 in a desired position. In this case, a lip 460 borders slot 456; a bottom portion of lip 460 closes over header 454 and prevents header 454 from escaping or moving when header 454 fits into slot 456.

The walls 453 of casing 452 include a flexible material that permits the walls to flex as header 454 moves downward into the angled and radially decreasing top portion of lip 460 (as illustrated by arrows 462). Once header 454 reaches the groove at the bottom of lip 460, it enters slot 456 and the walls of casing 452 elastically return to their pre-bent state, which in conjunction with bottom portion of lip 460, holds header 454 in slot 456. Elastic return of walls 453 also serves to substantially seal the interface of header 454 and casing 452 along slot 456, without the use of an adhesive. In some cases, some sealant or epoxy may be added to slot 456. The flexibility of walls 453 contrast conventional fuel processor casings, which are often made from ceramic; these ceramic fuel processors require parts to be bolted together.

Header 454 and casing 452 may include any cross-sectional shape. In one embodiment, header 454 and slot 456 are round. An octagonal casing 452 is shown in FIG. 2B. Other shapes are suitable for use. Materials for header 454 and slot 456 may also vary. In one embodiment, header 452 includes a rectangular metal (e.g., stainless steel) plate, while casing 452 includes a flexible plastic material. In this case, the rigid metal header 454 pushes out the opening of the plastic casing 452 when inserted. Because plastic is flexible and somewhat elastic, the plastic snaps back when the header 454 is pushed in into slot 456. At this point, the header 454 is secure between two surfaces of slot 456. The snap together features of casing 452 thus facilitate and expedite assembly of a fuel processor.

In one embodiment, casing 452 creates a space between an inner surface of the casing and an outer surface of the fuel processor or a dewar included in the fuel processor. As described, above, a fuel processor may include a dewar that preheats air entering the fuel processor to increase fuel processor efficiency. The space also reduces heat transfer to the outside of casing 452.

The skin temperature of monolithic structure 100 may reach temperatures of up to 200-300° C. Walls of casing 452 include a material that withstands these temperatures and is sufficiently insulating to maintain the fuel processor temperature. In one embodiment, the casing comprises high temperature plastic. By using high temperature plastic, the casing is lighter, more insulating, and able to withstand a continuous temperature of at least 300° C. Other materials may be used, such as suitably rigid metals. Several commercially available polyimide plastics are also suitable for use with the casing. One example is Sintimid® made by Ensinger (www.ensinger-online.com). Sintimid permits a continuous temperature of about 300° C. and a maximum short-term surface temperature of about 350° C., includes a thermal conductivity of about 0.22 W/m*K, and a density of about 1.35 g/cm2. The high temperature plastic casing is light, insulating, and easier to assemble with a fuel processor. The increased insulation traps heat within the fuel processor and increases fuel processor efficiency.

Start-Up Vaporizor

Typically, methanol is stored as a liquid and catalytically processed in the fuel processor in a gaseous state. This implies that the liquid methanol is at least partially vaporized prior to entering the reformer. As mentioned above, liquid hydrocarbon fuels offer high energy densities and the ability to be readily stored and transported. Many conventional fuel processors employ a combustive or catalytic burner to both heat the fuel processor during start up and to maintain the fuel processor at temperature during operation.

Most burners cannot start combustion effectively with a liquid fuel, and this dilemma worsens with decreasing fuel temperatures (e.g., in cold climates). As a result, the liquid fuel is pre-heated before it reaches the catalyst bed. Typically, the liquid fuel is vaporized before it reaches the catalyst bed in order to assure combustion initiation and to increase catalyst bed life. Vaporizing the methanol increases interaction with a catalyst in the reformer and increases fuel processor efficiency.

A fuel processor may thus heat methanol before catalytic processing. Fuel processor embodiments described above include configurations that allow for methanol preheating using heat passed from a burner to the reformer through walls between the burner and reformer. These designs do not work very well during startup, that is, before walls of the reformer have achieved an elevated temperature.

This section describes a heater that pre-heats methanol and elevates methanol temperatures entering a fuel processor. This is useful for fuel processors during start-up and fuel processors such as those described above with wall heating. Other fuel processor designs may also benefit. For example, the heater is useful in any fuel processor to heat incoming fuel, and not just those using a catalytic burner or wall heating as described above.

Figure 12A:
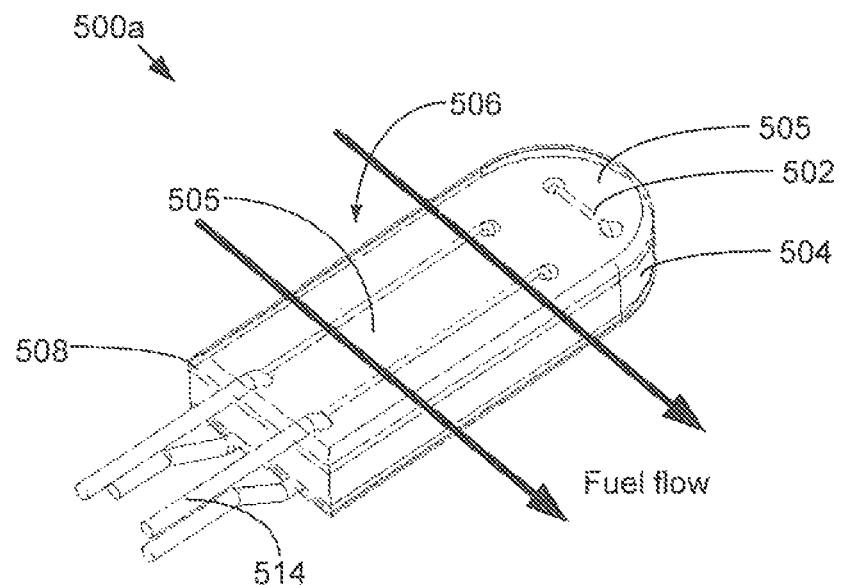
FIG. 12A illustrates an electrical heater for use in a fuel processor in accordance with one embodiment of the present invention.
Figure 12B:
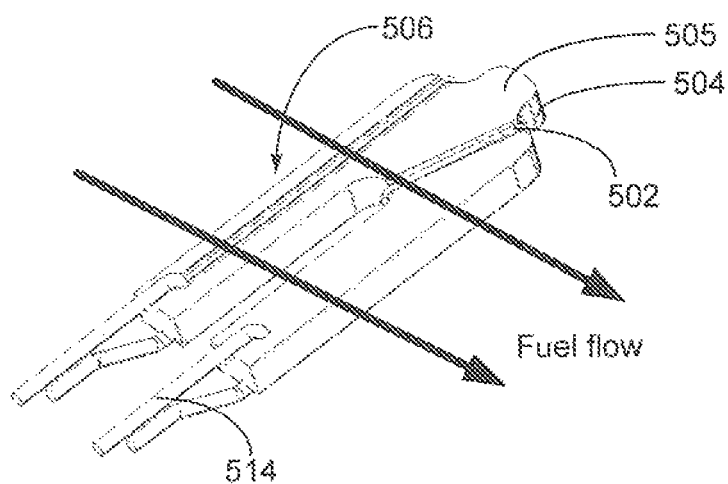
FIG. 12B illustrates an electrical heater for use in a fuel processor in accordance with another embodiment of the present invention.

FIG. 12A illustrates an electrical heater 500a for use in a fuel processor in accordance with one embodiment of the present invention. Heater 500a is an electrical heater that is configured to heat methanol before receipt of the fuel by burner 30 in fuel processor 15. FIG. 12B illustrates an electrical heater 500b for use in a fuel processor in accordance with another embodiment of the present invention. Electrical heaters 500a and 500b both include a heating element 502, substrate 504 and a heating channel 506.

Heating element 502 generates heat. A wire-heating element 502 is suitable in many instances and provides resistive heat generation according to electrical energy supplied to the wire, which permits electrical and digital on/off control of heat generation. Inconel or nickel heating elements are suitable for many fuel processors, and the present invention contemplates other heating elements. In a specific embodiment, the heater comprises a wire photoetched film. Heat from element 502 conducts into substrate 504. A wire-heating element 502 may be insulated leading to the heater, for example, using a fiberglass insulated electrical wrapping.

Element 502 may include a wide variety of materials. In a specific embodiment, element 502 includes a Kanthal-D wire element (Fe—Cr—Al) as provided by Sandvik Materials Technology of Hallstahammar, Sweden Additional materials for element 502 include: NiCr, NiCrFe (nichrome, inconel, nikrothal), NiFe (nifethal), CuNi (cuprothal), platinum, and RhPt, for example. In addition, element 502 may include any material with: stability under high temperature fluctuations; stability under extended periods of time at high temperature; and/or mechanical strength to withstand vibration and other mechanical forces incurred during rough handling.

Substrate 504 increases surface area interaction with the fuel passing through channel 506 (relative to element 502). Preferably, substrate 504 includes a high thermal conductance material to increase the speed, at which its surface heats up. In a specific embodiment, substrate 504 comprises anodized aluminum or another high thermal conductance metal. One face or major side of the heat transfer channel opens up to channel 506 and permits convective heat, transfer info incoming methanol (and, secondarily, radiative heat transfer with other walls in the channel, which then convect heat into the methanol). Substrate 504 may include flat surface areas and specially configured geometric shapes that provide a boundary surface for channel 506.

Many materials are suitable for use with substrate 504. In a specific embodiment, substrate 504 includes anodized aluminum. Additional materials for substrate 504 include: silicon carbide, silicon, boron nitride, and silicon nitride, for example. In addition, element 502 may include any material with: high thermal conductivity; low electrical conductivity (a coating may be applied, if the material has high electrical conductivity); and/or good mechanical strength such that stresses applied on the heater by mounting or electrical connections are bourne by the substrate.

Substrate 504 contacts element 502 and permits conductive thermal communication between the two. Thermal contact my include wrapping, winding the element about the substrate, etc. For heater 500a, wire element 502 passes through several holes in substrate 504 so as to prevent the likelihood, of an electrical short circuit within element 502. Electrical contacts 514 attach to both substrate 504 and element 502 at the lower edge of heater 500a. For heater 500b, element 502 wraps around substrate 504 using grooves in the substrate 504. More specifically, element 502 wraps around a series of channels formed on the top and bottom surfaces 505 of substrate 504. This differs from heater 500a in that element 502 does not need to be fed through a series of holes but can be directly wound, thereby reducing the assembly time. Other arrangement and forms of conductive heat transfer are also suitable. For example, other methods, such as chemical vapor deposition, sputtering, photo-fabrication etc, may also be used to dispose a heating element onto the substrate. In one embodiment, the element is held in place by mechanical means (wrapping, winding, additional mechanical support, etc.). Reliance on a chemical bond between different materials may also be employed. In another embodiment, electrical conductors are attached to both the electrically resistive material and the dielectric substrate, thereby adding mechanical strength to the electrical interface.

In operation then, substrate 504 a) receives heat from element 502 via conduction and b) provides the heat to the incoming methanol via convection. In a specific embodiment, element 502 and/or substrate 504 is maintained at a suitable temperature to vaporize the methanol.

Heater 500 may also include means for increasing thermal conductance between heating element 502 and substrate 504. For example, a wire element 502 and aluminum substrate 504 may be soldered together to increase thermal conductivity from the wire into the aluminum. In a specific embodiment, an electrically insulating and thermally conductive material (or 'packing') is placed between element and substrate. The packing also prevents hot spots from developing in element 502 by improving transfer of heat generated by the element into substrate 504. In another embodiment, a thermoelectric glue attaches the two. The glue distributes heat away from a wire-heating element 502 faster and prevents the wire from overheating or melting.

A thermoelectric glue or thermally conductive material 508 may also be applied to cover substrate 504. For heater 500a, the thermally conductive material 508 covers the heater entirely. This distributes the heat faster and improves surface area interaction with methanol passing through channel 506. One suitable thermal-electric glue includes a commercially available ceramic glue such as Al2O3 Cotronics Resbond 920 as produced by Cotronics Corporation of Brooklyn, N.Y. Additional packing and thermally conductive materials 508 include: MgQ-ZrO2 (e.g., Cofronics: Resbond 919), and AutoCrete, for example. In addition, thermally conductive material 508 may include any material with: high thermal conductivity; electrical insulation; stability under high temperature fluctuations; stability under extended periods of time at high temperature; mechanical strength to withstand vibration and other mechanical forces incurred during rough handling; and/or resistance to oxidizing and reducing environments.

Additionally, one or more covers may be formed as separate components attached, to a heater, or as part of a housing into which the heater is placed. The cover provides added chemical resistance and distributes heat uniformly across the surface of the heater.

Heating channel 506 includes a volume that the incoming fuel passes through and in which the heater 500 transfers heat from the heating element 502 and/or substrate 504 to the incoming fuel. In one embodiment, channel 506 includes a portion of the methanol inlet channel or duct for a reformer or burner. Channel 506 is at least partially bound by a surface 505 of substrate 504 and is configured to permit fuel passage in channel 506 and across surface 505.

When element 502 and substrate 504 are attached, heater 500 provides stress relief, strength and resistance to vibration because the element is mechanically attached to the substrate and electrical inter-connects. Heater 500 is also not significantly impacted by differences in thermal expansion coefficients of the different materials. It can therefore use cost effective materials and does not require elaborate processing equipment in the manufacturing process.

Heater 500 may be located in a number of places in fuel processor 15. In one embodiment, electrical heater 500 is located in fuel processor 15 to intercept incoming fuel before the fuel reaches the reformer. In another embodiment, heater 500 is located in the fuel processor to intercept incoming fuel before the fuel reaches one or more burner chambers. This is useful to facilitate start-up of the fuel processor. In this case, heater 500 vaporizes the incoming fuel so the burner can start combusting gaseous methanol and heat the rest of the fuel processor quickly.

In one embodiment, the heater is located at an intersection of the air and methanol fuel inlets. FIGS. 4B-7B show several intersections between an air inlet and the inlet burner fuel. For example, the heater may be attached to one of end plates 182 and 184 from FIG. 2A or in interconnect 190 of FIG. 2A at the intersection of the air and methanol fuel inlets. In this case, vaporized methanol output by electrical heater 500 is immediately mixed with incoming air. This reduces the molecular concentration of gaseous methanol in air, which reduces the likelihood of subsequent methanol condensation. In another specific embodiment, heating element 502 and substrate 504 are small enough to be placed in an inlet methanol duct, such as one of lines 27 or 29 in FIG. 1B.

In one embodiment, heater 500 is located in the fuel processor 15 such that components of heater 500 are thermally isolated from conductive heat transfer with other large components in the fuel processor. For example, heater 500 may be glued to one of end walls 182 or 184 to minimize thermal conduction with monolithic structure 100 (and its reformer, burner and boilers). Thermal isolation between the heater and other components of a fuel processor increases efficiency of the heater. In embodiments described above where the fuel processor comprises an annular copper construction and/or monolithic structure 100, the heater is preferably thermally isolated from the copper material. This prevents heat transfer from the heater to the larger monolithic structure 100, which when made of copper, conducts heat well and increases the amount of energy that heater 500 needs to heat incoming methanol. This is particularly significant during start-up; the monolithic structure 100 can be heated using combustion in the burner 30. In other words, isolating the heater localizes the area and volume of solid material heated and minimizes heating energy needed to power the heater. In a specific embodiment, a low thermal conducting epoxy or glue is used to attach heater 500 to a component of fuel processor 15, which minimizes the amount of heat transfer to fuel processor 15.

Heater 500 may be characterized by its intended application and performance. For example, heater 500 may be configured to meet a particular operating temperature, output heat and/or design criteria. A heater temperature high enough to flash boil methanol as the methanol passes across the heating surfaces is suitable in many cases. In a specific embodiment, the heating surfaces are maintained at a temperature of 100° C. or greater. Alternatively, energy and heat density output by heater 500 may characterize the device. In one embodiment, heater 500 includes an energy density of about 40 to about 70 Watts per centimeter squared. Other operating temperatures and heat densities are suitable for use. In another embodiment, heater 500 is configured to vaporize methanol. In this case, the heater provides enough energy to flash boil methanol as it passes the heater and across the heating surfaces. As one of skill in the art will appreciate, the operating temperature and amount of heat needed to flash boil methanol will be dependent on the amount of methanol, surface area of substrate 504, power supplied and resistance achievable in the heating element.

In one embodiment, the present invention provides an electrical heater that reaches a surface temperature of about 150-250° C. in seconds (e.g., from about 2 seconds to about 30 seconds). In a specific embodiment, the heater reaches this temperature with liquid flowing over the surface at ~25 ml/hr and air at ~1 SLPM. Other flow rates may be employed.

Figure 13:
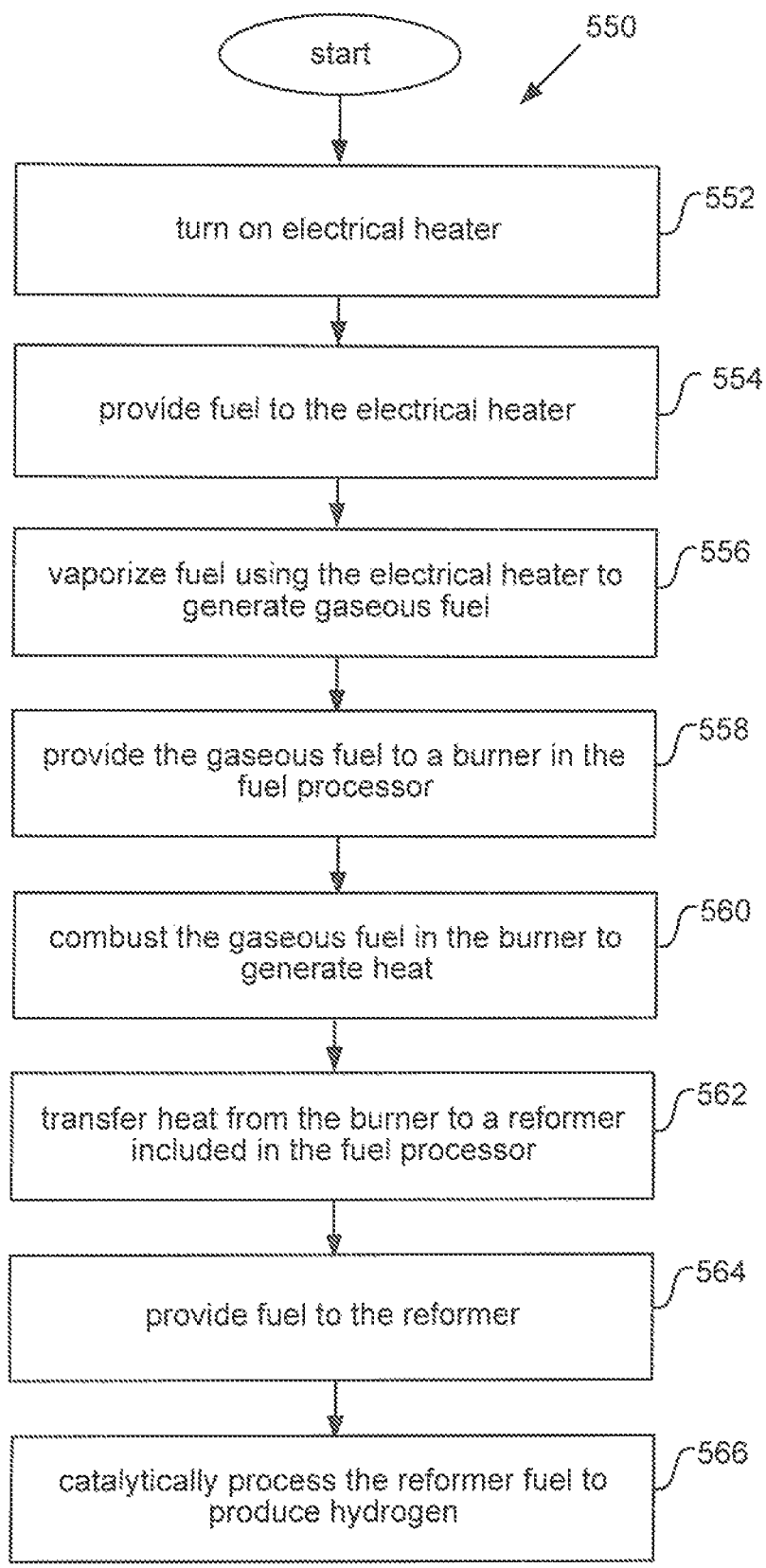
FIG. 13 shows a method for producing hydrogen in a fuel processor in accordance with one embodiment of the present invention.
Figure 14A:
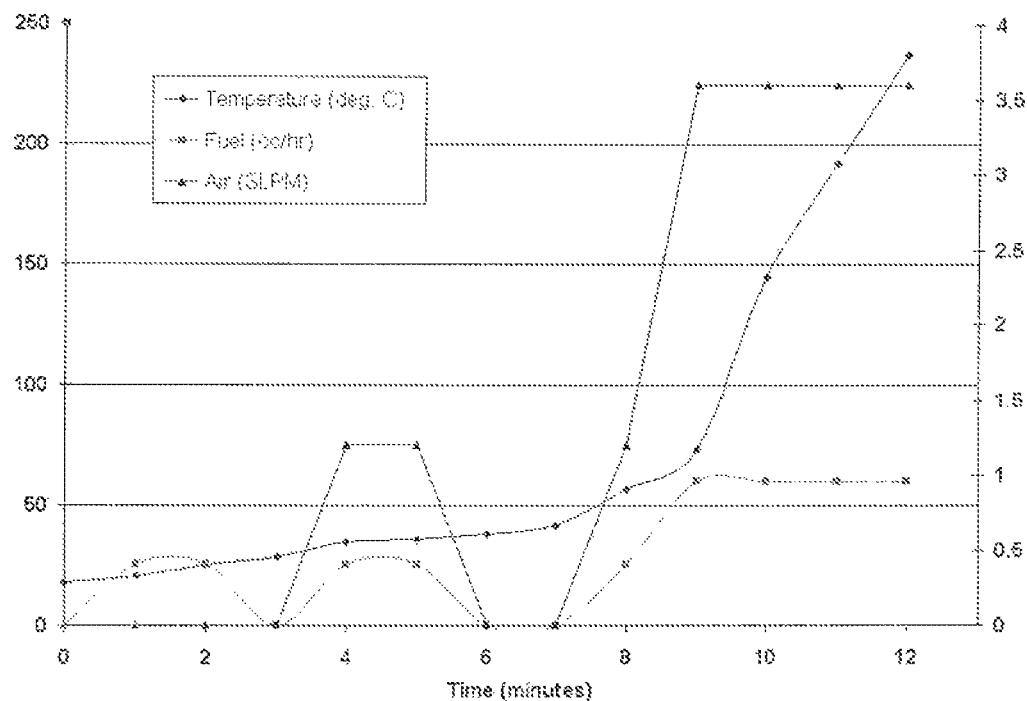
FIGS. 14A and 14B show temperature increases as a function of fuel and air flow with exemplary electrical heaters in accordance with specific embodiments of the present invention.
Figure 14B:
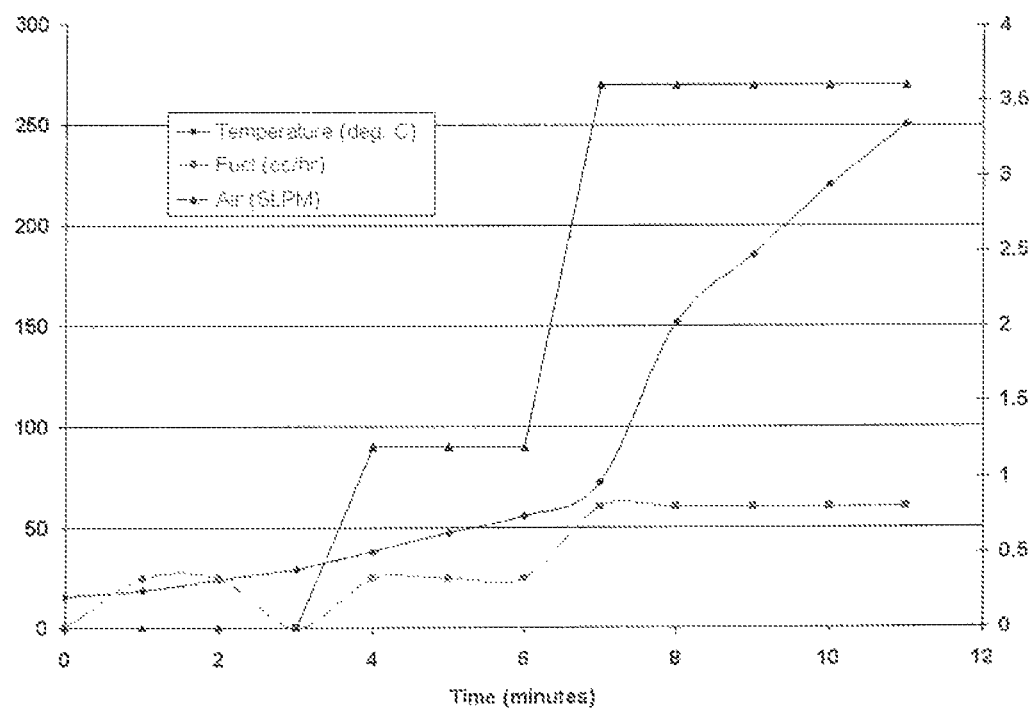

Heater 500 is well suited for use during start-up of a fuel processor. FIG. 13 shows a method 550 for producing hydrogen in a fuel processor in accordance with one embodiment of the present invention. Method 550 is well suited for hydrogen production at start-up of a fuel cell system, and any other subsequent time.

Method 550 begins by turning on an electrical heater (552). The heater may sit for a pre-heat period; from about 10 seconds to about 60 seconds is suitable for some fuel processors. A pre-heat period of about 30 seconds may also be used. Shorter and longer pre-heat periods are also contemplated. In one embodiment to heat a fuel, the present invention places an electrically resistive element in contact with a thermally conductive substrate. When a voltage is applied across the electric conductors, current flows through the electrically resistive material thereby generating heat; the current flow being related to a ratio of the voltage divided by the resistance of the element.

Fuel is then provided to the electrical heater (554—or a 'pre-feed' stage). Embodiments described above use a pump to move liquid fuel from a storage device into the fuel processor. The amount of liquid fuel moved is generally proportional to the fuel cell system size and requirements. The fuel moves into the fuel processor and a heater cavity or channel having a surface that includes a surface of the thermally conductive substrate.

A pre-ignition stage heats the liquid fuel (556- or a 'pre-feed' stage). IN one embodiment, the heater vaporizes at least a portion of the fuel to generate gaseous fuel. More specifically, while the heater is still ON, the pre-feed methanol is allowed to vaporize for a suitable duration. From about 10 seconds to about 60 seconds is suitable in some cases. A pre-ignition duration of about 30 seconds may also be used.

Method 550 then proceeds with providing the gaseous fuel to a burner in the fuel processor (558) and combusting the gaseous fuel in the burner to generate heat (560). As described, above, a burner may include multiple burner chambers or multiple combustive burners, and in this case, the fuel goes to at least one of the burners. In one embodiment, in a pre-combustion stage, a burner oxygen or air supply turns on and combustion commences in the burner from about 10 seconds to about 60 seconds to generate heat. The pre-combustion duration may also be specifically determined, to satisfy a predetermined and feedback controlled initial burner or reformer temperature, for example.

At least a portion of the heat transfers from the burner to a reformer included in the fuel processor (562). For the monolithic structures 100 described above, the heat transfer occurs via inward conduction through the monolithic structure (see FIG. 2B). Other heat transfer paths may also carry the heat to the reformer or its walls, as one of skill in the art will appreciate.

After the pre-combustion period, the liquid fuel flow to the reformer starts (564). This may occur when a start temperature has been reached in the fuel processor, such as an operating temperature of the fuel processor for the fuel being consumed, or may be less than the operating temperature. In one embodiment, a temperature sensor reads the temperature of a location within the burner and/or reformer or at the burner and/or reformer exit, or in a cavity adjacent to the burner, such as the reformer catalyst bed. Other locations in the fuel processor may be used for temperature sensing.

As temperatures climb, the fuel and airflow rates may be adjusted such that the burner stoichiometry increases from less than one (1) to a number greater than one. In general, the burner duty will vary with temperature and rate of temperature change. After the pre-combustion period, the rate of temperature rise will increase, and at this point, the burner duty can be further increased in order to speed, burner and fuel processor heat-up, and the electrical heater can be turned OFF by turning off the electrical input. Finally, as the combustive burner temperature starts to approach its set point, the burner duty may be decreased in order to prevent overheating of the catalyst bed internals, and also to prevent any hot spots.

Eventually, the reformer begins catalytically processing fuel to produce hydrogen (566). Once the fuel processor has achieved steady state and walls of the reformer have climbed, to a temperature suitable to heat incoming methanol, the electrical heater may be turned off. In this case, the heater is only used to preheat methanol during startup. Alternatively, the heater may be used as a preheat assist, where the heater turns on intermittently to assist another fuel preheat mechanism (such as a dewar). In both instances, feedback temperature control of the inlet methanol or temperature of components such as a wall of the fuel processor may be used to determine when the electrical heater operates.

A specific example of a timing sequence for startup of a fuel processor is shown in Table 1. This sequence is useful for the start up and ignition of a methanol fuel processor such as that described above.

TABLE 1

Ignition Timing Sequence (1)

| Time | HTR | Fuel [ml/hr] | Air [slpm] |
|------|-----|--------------|------------|
| 0    | ON  | 0            | 0          |
| 30   | ON  | 30           | 0          |
| 60   | ON  | 0            | 0          |
| 90   | ON  | 0            | 3          |
| 120  | OFF | 30           | 3          |

Exit to Temp Control when Temp > 50 C.

This method of initiating catalytic combustion provides a fuel rich concentration of vapor in the burner chamber. This will deliver ample fuel to react with the air that is eventually supplied. Furthermore, the vaporized, fuel will convectively transfer heat away from the electrical heater and throughout the burner catalyst bed, thereby increasing the temperature in the bed and facilitating catalytic reaction.

An alternative ignition timing sequence is shown in Table 2.

TABLE 2

Ignition Timing Sequence (2)

| Time | HTR | Fuel [ml/hr] | Air [slpm] |
|------|-----|--------------|------------|
| 0    | ON  | 0            | 0          |
| 30   | ON  | 0            | 3          |
| 60   | ON  | 0            | 3          |
| 90   | ON  | 30           | 3          |
| 120  | OFF | 30           | 3          |

Exit to Temp Control when Temp > 50 C.

This method has a pre-heat period, which distributes the heat with air into the burner catalyst chamber before introducing fuel. The burner will then be more conducive for a catalytic reaction.

In one embodiment, once ignition has been demonstrated, e.g., as evidenced by the temperature exceeding 50 degrees Celsius, the startup process becomes temperature dependant. The fuel and airflow rates are then adjusted from a rich to lean mixture as the temperature increases. Higher flow rates spread the heat generated throughout a burner chamber. Table 3 shows another suitable sequence for starting up a methanol fuel processor.

TABLE 3

Temperature Control

| Temp | Duty | Stoichiometry |
|------|------|---------------|
| 50   | 50   | 0.6           |
| 75   | 150  | 0.9           |
| 100  | 200  | 1.1           |
| 125  | 300  | 1.3           |
| 150  | 300  | 1.5           |
| 175  | 250  | 1.7           |
| 200  | 200  | 1.9           |
| 225  | 150  | 2             |
| 250  | 100  | 2             |
| 275  | 50   | >1            |
| 300  | load level | >1.5    |

In one embodiment, fuel processor start-up methods initially vaporize fuel and then increase heat duty (which starts to reduce as the temperature gets closer to its set point) and increase combustion stoichiometry. These steps cause the fuel processor to reach its operating temperature in a timely manner. Exemplary test data for different startup sequences is included below in FIGS. 9A and 9B. FIG. 9A shows temperature increase as a function of fuel and airflow with a 7 W electrical heater. FIG. 9B shows temperature increase as a function of fuel and airflow with a 10 W electrical heater.

In one embodiment, two electrical heaters 500 are installed in a fuel cell system and off most of the time except during system startup. Exemplary operating and environmental conditions that the heaters may experience are outlined in Table 4.

TABLE 4

| Duty Cycle | Heater Status | Max required heater skin Temp | Environmental Conditions |
|------------|---------------|-------------------------------|--------------------------|
| Balance of 24 hours | off | n/a | −20 to 60° C. |

TABLE 4-continued

| Duty Cycle | Heater Status | Max required heater skin Temp | Environmental Conditions |
|---|---|---|---|
| 7 hours per day | off | n/a | Up to 320° C. Mixture of air, CO, H2, steam |
| 5 minutes (2 times per day) | ON | 250-300° C. | Liquid Methanol, Air at T < 200° C. |

From Table 4, it can be seen that the heater(s) will be off most of the time. In this case, the heaters are typically actuated, only several times per day and can survive extended periods of time at elevated temperatures in both reducing and oxidizing environments.

A vast number of alternative startup sequences may also be used according to the present invention. For example, although the startup methods have been discussed, with respect to a single cycle, repeated cycling may also be used to achieve a desired starting condition or temperature.

While this invention has been described in terms of several preferred embodiments, there are alterations, permutations, and equivalents that fall within the scope of this invention which have been omitted for brevity's sake. For example, although the present invention has described fuel processors in a portable fuel cell systems, it is not related to small or portable systems. It is therefore intended that the scope of the invention should be determined with reference to the appended claims.

What is claimed is:

1. A method for producing hydrogen in a fuel processor, the method comprising:
    turning on an electrical heater;
    passing fuel over a surface of the electrical heater;
        vaporizing at least a portion of the fuel using the electrical heater to generate gaseous fuel; providing the gaseous fuel to a burner in the fuel processor;
        combusting the gaseous fuel in the burner to generate heat;
        transferring at least a portion of the heat from the burner to a reformer included in the fuel processor;
        providing fuel to the reformer; and
        catalytically processing the reformer fuel to produce hydrogen; and
    wherein the fuel processor includes a monolithic structure having a common material included in walls that define the reformer and the burner, and wherein the reformer includes a first reformer chamber for outputting hydrogen and any unprocessed fuel and a second reformer chamber for receiving and processing fuel from the first reformer chamber, wherein the reformer is configured such that fuel flows through the first reformer chamber in a direction parallel to the fuel flow direction through the second reformer chamber.

2. The method of claim 1, further comprising increasing a burner duty for the burner after the burner starts catalytically generating heat.

3. The method of claim 1, further comprising varying combustion stoichiometry for the burner after the burner starts catalytically generating heat.

4. The method of claim 1, further comprising turning off the electrical heater when the burner starts catalytically generating heat.

5. The method of claim 1, further comprising providing oxygen to the burner.

6. The method of claim 1, further comprising increasing fuel flow to the burner after the fuel is initially combusted in the burner to generate heat.

7. The method of claim 1, wherein
    the first reformer chamber including a first reformer chamber inlet configured to receive the fuel, including a catalyst capable of processing the fuel to produce hydrogen, and including a first reformer chamber outlet,
    the second reformer chamber including a second reformer chamber inlet, including a catalyst capable of processing the portion of the fuel from the first reformer chamber to produce hydrogen, and including a second reformer chamber outlet configured to output hydrogen from the second reformer chamber,
    wherein the reformer is configured such that fuel flows from the first reformer chamber inlet to the first reformer chamber outlet and from the second reformer chamber inlet to the second reformer chamber outlet.

8. The method of claim 7, wherein fuel flows from the first reformer chamber inlet to the first reformer chamber outlet in a first direction, and wherein fuel flows from the second reformer chamber inlet to the second reformer chamber outlet in a second direction, wherein the first direction and the second direction are in about opposite directions.

9. The method of claim 8, wherein the reformer further includes: a third reformer chamber including a third reformer chamber inlet that receives at least a portion of the fuel from the second reformer chamber, including a catalyst capable of processing the portion of the fuel from the second reformer chamber to produce hydrogen, and output the hydrogen and any unprocessed fuel from the third reformer chamber.

10. The method of claim 9, wherein the reformer is configured such that the fuel flows through the third reformer chamber from the third reformer chamber inlet to the third reformer chamber outlet in a third direction,
    the first direction and the third direction are in about the same direction, and
        the second direction is in a direction that is about opposite to the first direction and the third direction.

11. The method of claim 10, wherein the reformer or burner includes an internal wall with a chamfered corner or side.

12. The method of claim 10, wherein the first reformer chamber includes a largest orthogonal dimension that is substantially parallel to a largest orthogonal dimension for the second reformer chamber.

13. The method of claim 10, wherein the first reformer chamber includes a cross section that varies along a length of the first reformer chamber.

14. The method of claim 1, wherein the fuel flows through the reformer in a direction that at least partially circles an outside cross-sectional perimeter for the burner.

15. The method of claim 1, wherein the burner includes multiple burner chambers and the reformer at least bilaterally neighbors one burner chamber.

16. The method of claim 1, wherein the reformer includes two reformer chambers that bilaterally neighbor the burner.

17. The method of claim 16, wherein the reformer trilaterally neighbors the burner.

18. The method of claim 16, wherein the reformer quadrilaterally neighbors the burner.

19. The method of claim 1, wherein the fuel processor comprises a non-planar wall that is shared, by the reformer and the burner and permits conductive thermal communication from the burner to the reformer in orthogonal directions.

* * * * *